(12) United States Patent
Roy et al.

(10) Patent No.: US 6,266,385 B1
(45) Date of Patent: Jul. 24, 2001

(54) ELASTIC STORE FOR WIRELESS COMMUNICATION SYSTEMS

(75) Inventors: Joseph J. Roy; Cathal O'Scolai; Baya Hatim; Ismail Lakkis; Saeid Safavi; Deirdre O'Shea; Hoang Xuan Bui; Masood K. Tayebi, all of San Diego, CA (US)

(73) Assignee: Wireless Facilities, Inc., San Diego, CA (US)

( * ) Notice: Subject to any disclaimer, the term of this patent is extended or adjusted under 35 U.S.C. 154(b) by 0 days.

(21) Appl. No.: 08/997,150

(22) Filed: Dec. 23, 1997

(51) Int. Cl.[7] .................................................. H04L 7/00
(52) U.S. Cl. ........................ 375/372; 365/189.12
(58) Field of Search .......................... 375/372, 371; 370/516; 365/189.12; 711/109

(56) References Cited

U.S. PATENT DOCUMENTS

| | | | |
|---|---|---|---|
| 4,471,480 | 9/1984 | Haussmann et al. | |
| 4,764,941 | 8/1988 | Choi | 375/112 |
| 4,860,283 | 8/1989 | Takano et al. | 370/82 |
| 5,067,126 | 11/1991 | Moore | 370/112 |
| 5,181,225 | 1/1993 | Neeser et al. | 375/1 |
| 5,222,108 | * 6/1993 | Suzuki | 375/371 |
| 5,373,502 | 12/1994 | Turban | 370/18 |
| 5,420,894 | * 5/1995 | Boslough et al. | 375/372 |
| 5,444,658 | * 8/1995 | Izawa et al. | 365/189.07 |
| 5,473,665 | * 12/1995 | Hall et al. | 379/29 |
| 5,511,068 | 4/1996 | Sato | 370/18 |
| 5,533,013 | 7/1996 | Leppanen | 370/18 |
| 5,546,381 | 8/1996 | Fukushima | 370/18 |
| 5,555,247 | 9/1996 | Matsuoka et al. | |
| 5,568,472 | 10/1996 | Umeda et al. | 370/18 |
| 5,633,878 | * 5/1997 | Ernkell et al. | 371/24 |

FOREIGN PATENT DOCUMENTS

| | | |
|---|---|---|
| 2 213 025 | 8/1989 | (GB) . |
| 2 286 949 | 8/1995 | (GB) . |

OTHER PUBLICATIONS

Ruprecht, et al., IEEE, vol. 2, pp. 736–739, May 13, 1992, "Code Time Division Multiple Access: An Indoor Cellular System.".

* cited by examiner

Primary Examiner—Temesghen Ghebretinsae
(74) Attorney, Agent, or Firm—Knobbe, Martens, Olson & Bear, LLP

(57) ABSTRACT

A system and method of buffering data of a wireless communication system. The system and method maintain synchronization, end-to-end signaling and coding overhead bits needed to encapsulate data frames sent over wireless media. Additionally, the system and method compensate for transmitting and receiving clock variations. In one embodiment, the system uses framing of data with preamble, stuffing and signaling bits transmitted synchronously at a high data rate in the Industrial, Scientific and Medical (ISM) bands.

11 Claims, 18 Drawing Sheets

ELASTIC STORE SUBSYSTEM BLOCK DIAGRAM

SHIFT REGISTER BUFFER STRUCTURE

FIG. 5 RECEIVER DEJITTER BLOCK DIAGRAM

PROCESS FLOW FOR ELASTIC STORE SYSTEM

RESET PROCESS

WRITE REQUEST ANTI-METASTABLE SAMPLING PROCESS

WRITE REQUEST DETECTION PROCESS

READ REQUEST ANTI-METASTABLE SAMPLING PROCESS

READ REQUEST DETECTION PROCESS

BUFFER UPDATE PROCESS

BUFFER UPDATE PROCESS

DEJITTER PROCESS

FIG. 15  T3/E3/DS3 DEJITTER INTERCONNECTIONS

T1/E1/DS0 DEJITTER INTERCONNECTIONS

ARBITRATION CONTROL BLOCK DIAGRAM

ELASTIC STORE FOR WIRELESS COMMUNICATION SYSTEMS

RELATED APPLICATION

This application is related to U.S. application Ser. No. 08/954,217, filed Oct. 29, 1997, entitled Wireless Multimedia Carrier System, and to U.S. application Ser. No. 08/970,729, filed Nov. 14, 1997, entitled Wireless T/E Transceiver Frame and Signaling Controller, each having a common assignee.

NOTICE OF COPYRIGHT RIGHTS

The Appendices contain material which is subject to copyright protection. The copyright owner has no objection to the reproduction of such material, as it is appears in the files of the Patent and Trademark Office, but otherwise reserves all copyright rights whatsoever.

BACKGROUND OF THE INVENTION

1. Field of the Invention

The present invention generally relates to voice and data communication systems. More particularly, this invention relates to synchronous wireless communication systems.

2. Description of the Related Technology

T-carrier systems have become an essential part of modern telecommunications systems. A T-carrier system is found in every telephone company in North America. A T-carrier allows for transmission of one or more telephone calls or data connections by modem. The basic unit of signaling is DS0, followed by progressively higher speed signaling rates. First generation T-carrier systems, called T1 which carry Digital Signal Level 1 (DS1), employ a full duplex all-digital service. The digital stream is capable of carrying standard 64 kilobits per second (kbps) channels in which 24 channels are multiplexed to create an aggregate of 1.536 Mega bits per second (Mbps). Time division multiplexing (TDM) allows a channel to use one of 24 timeslots. More particularly, the 24 channels are time-division multiplexed into a frame to be carried along the data stream line. Typically, each frame contains one sample of 8 bits from each of the channels, and a framing bit. This structure results in a frame having 193 bits. In view of employing pulse code modulation (PCM) on each channel, there are 8000 frames per second. Hence, a frame is 125 microseconds long. Eight kbps of overhead bits are added (due to framing) to 1.536 Mbps, thereby yielding an aggregate of 1.544 Mbps.

A T1 system employs Alternate Mark Inversion (AMI) coding to reduce the required bandwidth of 1.5 MHz by a factor of two. The transmission is byte-synchronous whereby timing synchronization for each channel is derived from the pulses that appear within the samples (8 bits in each sample). This timing keeps everything in sequence. Although, a T1 system employs generically 24 channels of 64 kbps data plus 8 kbps of overhead (sometimes referred to as channelized service), the multiplexing equipment may be configured in other ways. For example, T1 may be used for a single channel of 1.536 Mbps, two high-speed data channels at 384 kbps each, and a video channel at 768 kbps. In short, a T1 system service does not have to be channelized into 24 timeslots. It can be split into any number of usable data streams.

T1-systems may multiplex T1 signals into a T2 (DS2) system, but with additional framing bits and 4 times the data rate. This results in an aggregate data rate of 6.312 Mbps. Similarly, a T3 digital link comprises a multiplexing of 7 T2 links (and additional framing bits), resulting in a data rate of 44.736 Mbps. The T3 system has greater demand in high capacity applications. The E carrier services are the European equivalents of the T-carrier.

The problem addressed by the present invention is the special case of transmitting data wirelessly between two systems working at the same nominal frequency. Moreover, the invention is intended for use in high speed data transmission requiring the avoidance of clocks with frequencies higher than the data bit rate.

A common synchronization technique used in the prior art is to synchronize received data to a local clock signal using a D-type flip-flop. This technique, however, produces errors whenever setup and hold time specifications for the flip-flop are violated. Another technique commonly used in the prior art is to use a first-in first-out (FIFO) register to provide the necessary elasticity required to properly synchronize the received data to the local clock signal. The use of a FIFO register, however, results in a certain ripple-through delay and initialization problems associated with such a register. Furthermore, some synchronization techniques are dependent on certain hardware characteristics. One such characteristic is a metastability problem which shows up whenever a flip-flop is clocked without a guaranteed setup and/ or hold time, which is exactly what happens when efforts are made to synchronize the data with a new clock.

Text books and papers abound on elastic store implementation. Elastic store read/write pointers can be implemented with separate binary up or down counters, separate up or down ring counters, or single binary up/down or single up/down ring counter. Elastic store data storage implementations include shift registers, addressable latches, and RAM.

Regardless of the implementation, the read and write subsystems are asynchronous to each other and need to be synchronized for some brief time for reliable data transfer. Some sort of arbitration scheme or handshake between read/write clocks, pointers, or data must take place in order to insure that the write data is not changing at the time it is being read (i.e. the metastable condition). Discussion of arbitration logic and its importance to reliable data transmission is neglected in the literature. The impact on Bit Error Rate when arbitration is ignored or improperly implemented is considerable. As an example, consider a 1 micosecond read/write data period and logic with a metastable window of 1 nanosecond. If the read and write are stochastically independent, the probability of reading a bit while it is changing is approximately equal to $1 \times 10^{-9} / 1 \times 10^{-6} = 1 \times 10^{-3}$ ! In fact the read and write rates are not independent since they are ideally equal. This could result in long periods where the read and write clock drift together, thus producing nearly continuous metastability and catastrophic error rates.

SUMMARY OF THE INVENTION

To overcome the above problems, the present invention provides a system and method of buffering data of existing wireless communication systems without the disadvantages of the prior art. The above-mentioned problems are solved by providing an elastic store system which maintains synchronization at the receiver, maintains end-to-end signaling and codes overhead bits needed to encapsulate data frames for wireless communication systems in frequency bands, such as the Industrial, Scientific and Medical (ISM) frequency bands, the National Information Infrastructure (NII), the Personal Communications Services (PCS) and other bands. The ISM frequency bands allocated by the Federal Communications Commission (FCC) are spread across the frequency ranges of 902–928 MHz, 2400–2484 MHz, and 5725–5850 MHz. The NII frequency bands are in the range of 5725–5825 MHz. The PCS technology operates in the frequency range 1850–1910 MHz for the uplink (i.e., mobile transmit, base receive) and 1930–1990 MHz for the downlink (i.e., base transmit, mobile receive). The elastic store system provides full duplex communications while maintaining proper end-to-end signaling schemes for a variety of wireless communication systems, such as mobile systems employing Code Division Multiple Access (CDMA) in which a transmitted signal is spread over a band of frequencies much wider than the minimum bandwidth required to transmit the signal, Time Division Multiple Access (TDMA) where the users share the radio spectrum in the time domain, Frequency Division Multiple Access (FDMA) where a user is allocated at least one unique frequency for communication without interference with users in the same frequency spectrum, or similar technologies.

In accordance with one embodiment of the present invention, the elastic store system provides a means of buffering a data stream to be transmitted in the ISM frequency bands, which may be written into its input at a different rate than it is read from its output. The elastic store system comprises two main subsystems: a transmit elastic store (TxEsto) subsystem at a transmitter and a receive elastic store (RxEsto) subsystem at a receiver. In one direction, the TxEsto generates a stuffing request, and provides underflow and overflow status of the data received from a channelizer to a framer for further processing. After detailed parallel processing, this data is sent over the air interface in the ISM band frequencies to the receiver. At the receiver, the RxEsto subsystem receives data from a deframer. For synchronization between transmitter and receiver clocks, the RxEsto subsystem clocks out the data, which is stripped off the data overhead bits, at the same rate as it was sent before encapsulation at the transmitter.

One embodiment of the present invention is a synchronous elastic store system, comprising a shift register having a plurality of data bits, the shift register receiving a stream of digital input data and a master clock input signal which is independent of the digital input data; and an arbiter that arbitrates between a read request and a write request to the shift register, the arbiter having the master clock as an input signal and providing a control signal to the shift register.

Another embodiment of the present invention is a synchronous digital elastic store system, comprising a shift register receiving a stream of digital input data and a master clock input signal, said master clock signal being independent of the digital input data; an arbiter that arbitrates between a read request and a write request, the arbiter providing a control signal to the shift register and generating at least one counter control signal; an up/down counter receiving the counter control signal from the arbiter and generating selector control signals; and a selector circuit receiving data from the shift register and receiving selector control signals from the up/down counter, said selector circuit selecting one of the shift register bits to be read from the elastic store.

Yet another embodiment of the invention is a method of storing a stream of digital data in a synchronous elastic store having a shift register, the method comprising the steps of receiving a stream of digital data and a master clock signal at the shift register; synchronously arbitrating between a read request and write request to generate an arbitration control signal; and shifting the digital data into the shift register in response to the arbitration control signal and the master clock signal.

Yet another embodiment of the invention is a synchronous elastic store system, comprising a channelizer; a synchronous elastic store having a read/write arbiter, the synchronous elastic store receivably connected to the channelizer; a framer receivably connected to the synchronous elastic store; and a wireless transmitter circuit receivably connected to the framer.

Yet another embodiment of the invention is a synchronous elastic store system, comprising a wireless receiver circuit; a deframer receivably connected to the wireless receiver circuit; a synchronous elastic store having a read/write arbiter, the synchronous elastic store receivably connected to the deframer; a dechannelizer receivably connected to the synchronous elastic store.

BRIEF DESCRIPTION OF THE DRAWINGS

The above and other aspects, features and advantages of the present invention will be better understood by referring to the following detailed description of the preferred embodiment, which should be read in conjunction with the accompanying drawings, in which.

DETAILED DESCRIPTION OF THE PREFERRED EMBODIMENTS

The present invention maintains synchronization between the transmitter and receiver clocks, end-to-end signaling and coding, and overhead bits need to encapsulate data frames sent over wireless media. The elastic store system comprises two main subsystems, namely, a transmit elastic store (TxEsto) subsystem and a receive elastic store (RxEsto) subsystem. The TxEsto subsystem receives parallel data from an existing channelizer, generates a stuffing request, and provides underflow and overflow status to a framer. The RxEsto subsystem receives parallel data from a deframer, strips off the data overhead bits and clocks out data at the same rate as it was sent before encapsulation at the transmitter.

A detailed description of the elastic store system is provided below. As one embodiment of the present invention, it is not intended to limit the enumerated claims, but serves as a particular example thereof.

Figure 1:
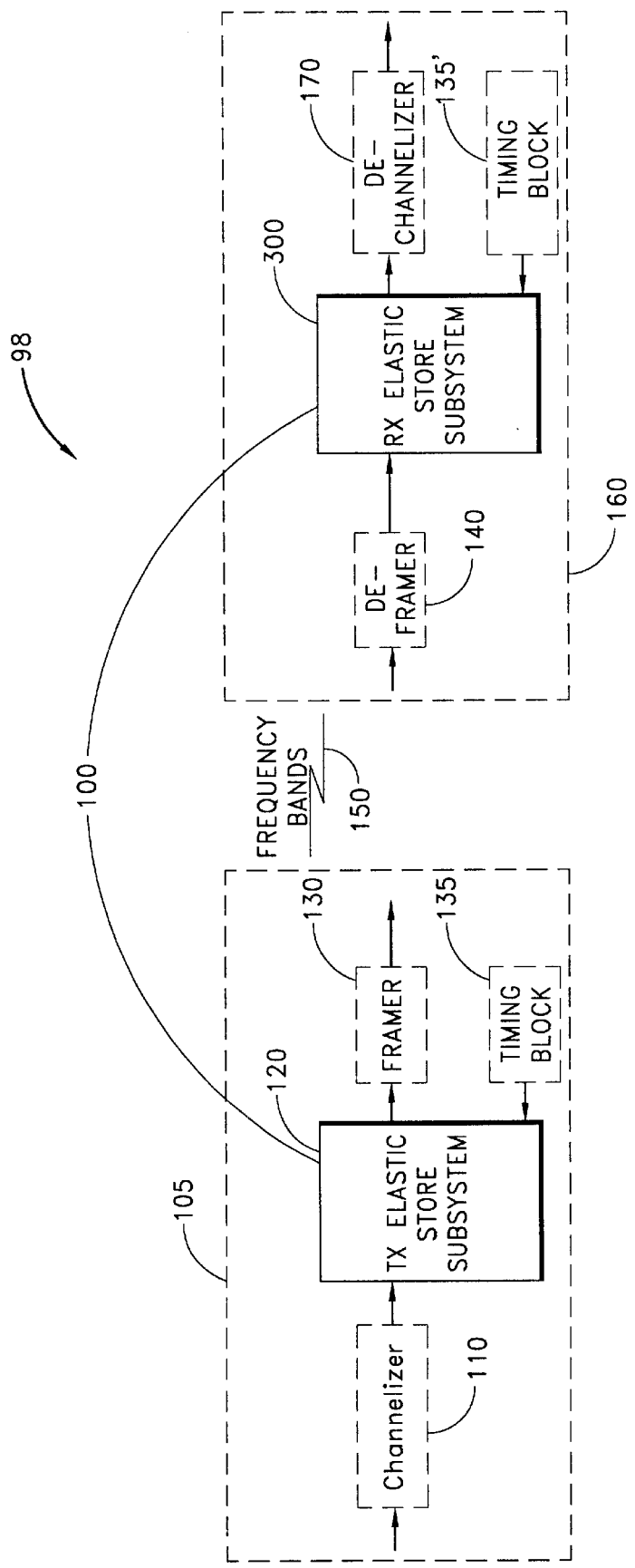
FIG. 1 is a functional block diagram depicting the location of the elastic store system in a synchronous wireless communication system.

FIG. 1 is a block diagram depicting the location of the elastic store system 100 in a wireless communication system 98. The elastic store system 100 supports full-duplex synchronous voice and data communications.

In this embodiment, the system 100 comprises a Transmit Elastic Store (TxEsto) subsystem 120 and a Receive Elastic Store (RxEsto) subsystem 300. The TxEsto subsystem 120, comprises a shift register that provides a means of buffering data that may be written into its input at a slightly different rate that it is read from its output. In one embodiment, the clock frequency used in writing data to the TxEsto 120 is 20 MHz. The TxEsto subsystem 120 communicates with a channelizer 110 and a framer and signaling controller 130 within a transmitter 105. The transmitter 105 consists of the TxEsto subsystem 120, the channelizer 110, the framer and signaling controller 130 and other functional elements. The channelizer acts as a demultiplexer or a line driver depending on the inputted data (e.g., demultiplexes the incoming data when it is of type T3 to 28 T1 channels). Various input data types are accommodated by the communications system, some of which are not multiplexed. As noted above, the input data signals may virtually be any standardized signal such as, for example, DS0/E0, T1/E1, T2/E2, T3/E3, Ethernet (LAN/WAN), intranet, or Internet signals. For one preferred embodiment, it is assumed that the input data signals are either multiple T1/E1 channels or a single T3/E3 channel. The transmitter 105 is characterized by a parallel structure for processing data extracted synchronously at substantially the same rate of a T1 (E1) channel. For formats having multiple embedded channels, e.g., T3/T1, the elastic store system 100 provides an elastic store for each embedded channel.

The framer and signaling controller 130 provides a frame structure to the data received from the TxEsto 120. After further processing, the resulting data is sent over an air-link 150 by use of a wireless transmitter circuit a and a wireless receiver circuit (not shown). In one embodiment, the air-link 150 corresponds to the ISM bands. The RxEsto subsystem 300 receives data from a deframer 140 which is in addition to other functional elements, a subsystem within a receiver 160. The deframer 140 strips the extra bits from the data stream and writes the resulting data to the RxEsto 300 at a certain clock frequency $f_1$. In one embodiment the clock frequency $f_1$ is 20 MHz. In other embodiments, the frequency $f_1$ may be selected from a range of about 10 KHz to 1 GHz. The RxEsto subsystem 300 buffers the data received from the deframer 140 and reads it out at a clock frequency $f_2$, which in one embodiment is a multiple of frequency $f_1$, e.g., 10 MHz, but in another embodiment may be at same as frequency $f_1$. The buffering of the data is done to avoid underflow and overflow states of the RxEsto.

A Rx Dechannelizer 170 receives output signals from the Rx Elastic Store subsystem 300. For example, when T3/E3 output is desired, the Dechannelizer 170 constructs T3/E3 data from N receive data streams. The Rx Dechannelizer 170 receives N data channels from the Rx Elastic Store 300 and constructs T3/E3 data from the N channels containing Rx packet data. The inputted data (multiple T1 channels/E1 channels) to the Rx Dechannelizer 170 can either be sent out as multiple T1/E1 channels or multiplexed into a single T3/E3 channel.

Figure 2:
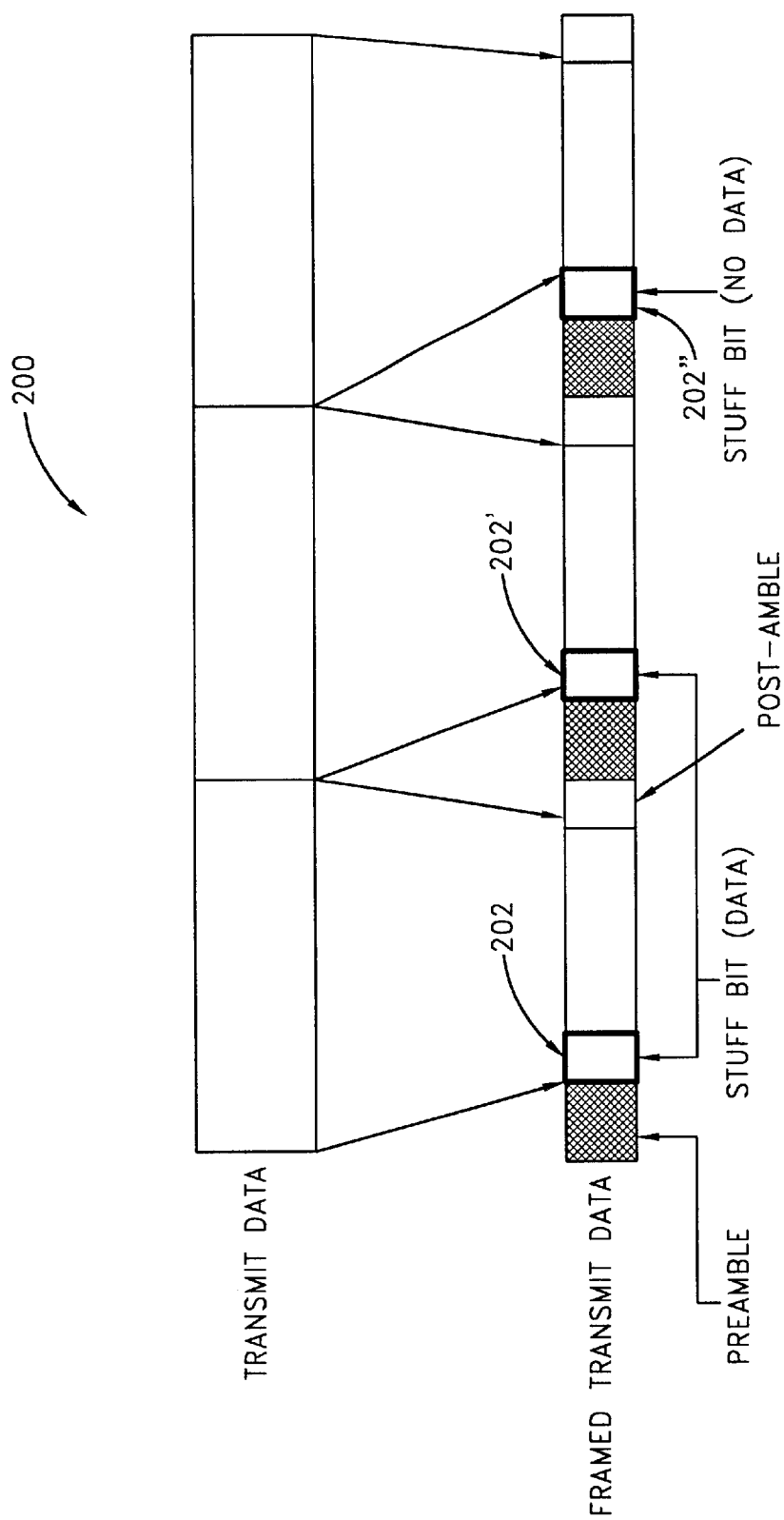
FIG. 2 is a block diagram of a data frame format using a stuff bit for the elastic store system shown in FIG. 1.

Referring now to FIG. 2, a data framing technique 200 using a stuff bit for the elastic store system 100 is described. One of the main functions of the TxEsto 120 includes a stuffing request to the framer and signaling controller 130 described in FIG. 1. Bit stuffing allows reading and writing of data without underflow or overflow of the elastic store system 100. The bit stuffing technique requires a pointer which indicates the current position in the buffer. The pointer is incremented when the elastic store is filling (write) and is decremented when the elastic store is emptying (read). Pointer status may indicate underflow, overflow, near underflow and near overflow. The near underflow status and the near overflow status are utilized by the elastic store subsystem to prevent occurrence of underflow or overflow conditions. Data is typically written into the elastic store at its lowest rank ordered position and shifted toward the highest rank ordered position. Data is read from the position indicated by the pointer. To illustrate bit stuffing, consider a typical synchronous communications link where data is encapsulated with overhead bits before transmission. At the receiver, the data overhead bits are stripped off and the data is clocked out at the same rate as it was sent before encapsulation at the transmitter Because of the relative drift of the transmitter and receiver clocks, a dynamic adjustment of the link data transfer rate is necessary to avoid eventual buffer underflow or overflow. This is done by adding more overhead bits including a preamble and a postamble to the frame encapsulation An example of a preamble is a two bit Barker Code, and examples of postamble bits are signaling, stuffing, and justify bits. In one embodiment, the postamble comprises the stuffing bit 202 and multiple justification bits. The stuffing bit 202 dynamically changes from a real data bit 202' to a stuff bit 202" on a frame by frame basis (see FIG. 2). Whether the stuffing bit is a real data bit or not is indicated by the justification bits. There are multiple justification bits to allow enough Hamming distance in coding the meaning of the stuffing bit. The transmitter 105 normally sends real data in the stuffing bit position and sets the corresponding justification code. When its elastic buffer 120 is near empty, it sends no data in the stuff position and sets the corresponding justification code. The receiver 160 decodes the justification bits, putting the stuffing bit into its elastic buffer 300 when the justification bits indicate the stuff bit is data, and throws away the bit and suppresses the write clock to the elastic store 300 when the justification bits indicate the stuff bit is not data.

Figure 3:
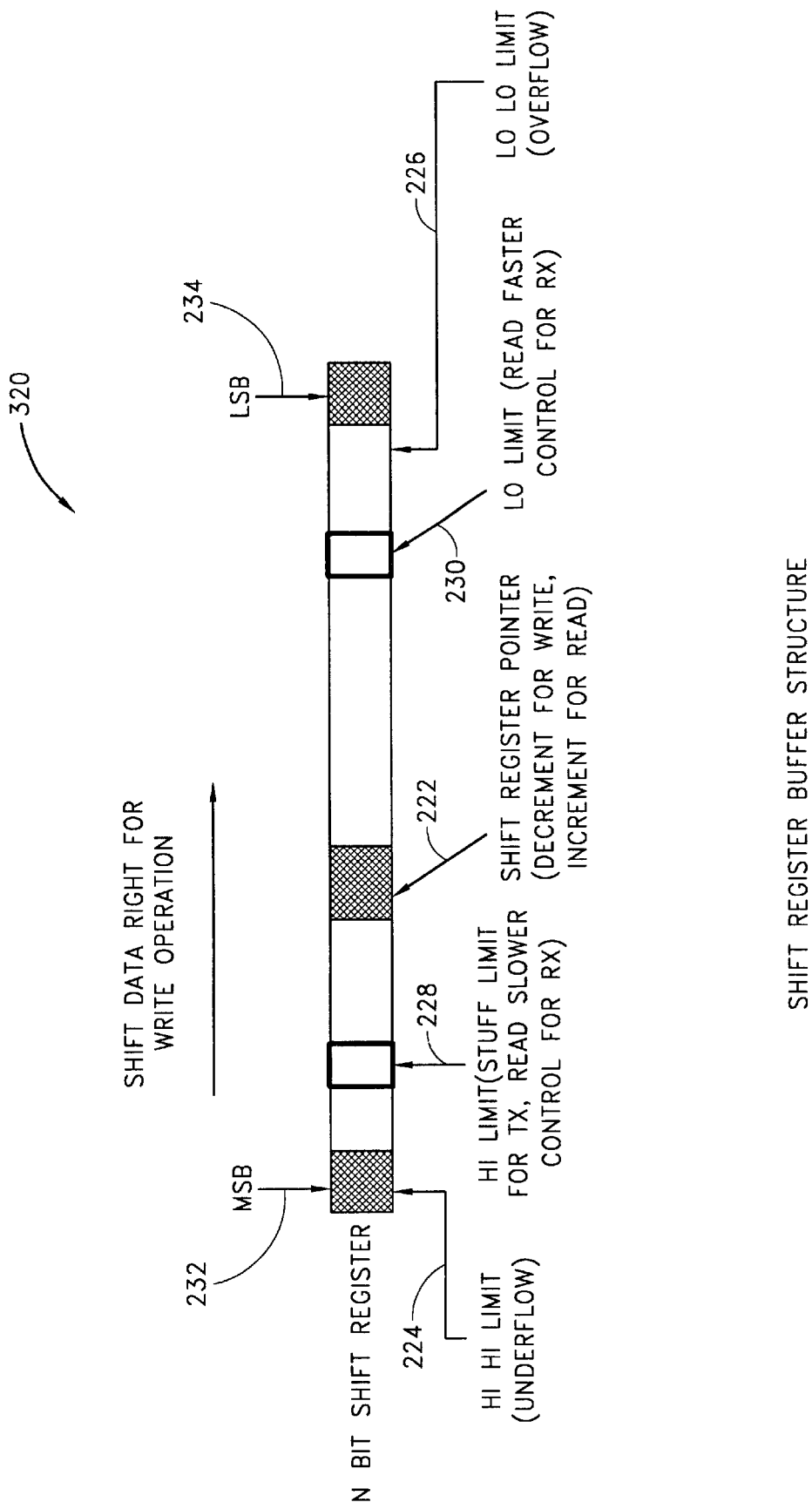
FIG. 3 is a block diagram of a structure for a shift register that is used within the elastic store system shown in FIG. 1.

Now referring to FIG. 3, a shift register buffer structure 320 used within the elastic store system is described. The shift register 320 consists of n-bits which corresponds to the number of Data bits in the shift register, i.e., the length of the shift register. In one embodiment, n=12 bits for the Tx Elastic Store 120, and n=14 bits for the Rx Elastic Store 300. In other embodiments, the length of the shift register may vary depending on the type and format of the input data. The shift register 320 also includes a pointer 222 which is decremented for writes and incremented for reads, a $HiHi_{13}$ LIM 224 which indicates the underflow status (this limit is equal to eleven for the Tx Elastic Store and is equal to thirteen for the Rx Elastic Store), a $LoLo_{13}$ LIM 226 that indicates the overflow status (this limit is equal to zero for both the Tx and Rx Elastic Stores), and a $Hi_{13}$ LIM 228 (this limit is equal to nine for the Tx Elastic Store and eleven for the Rx Elastic Store). The $Hi_{13}$ LIM 228 indicates for the Tx Elastic Store 120 that a stuff request should be generated to the framer 130 and indicates for the Rx Elastic Store 300 a read slower control to the Dechannelizer 170 (FIG. 1). In one embodiment, the Dechannelizer is a digital multiplexer whereby the 28 T1 channels, as an example, can be multiplexed back to one T3 channel. In addition to these parameters, a $Lo_{13}$ LIM parameter 230 (this limit is equal to two for the Rx Elastic Store and is not needed for the Tx Elastic Store) is used to indicate a read faster control in the case of the receive elastic store. The shift register pointer 222 is initialized first to a given value, then, depending if it is a write or read operation, the shift register pointer 222 is shifted to the right or left respectively. Furthermore, the data is right shifted for a write operation only from the most significant bit 232 to the least significant bit 234. In another embodiment, the four limits described above may be dynamically set by a micro-controller (not shown), such as a Hitachi H8/3048, that is part of the communication system 98 (FIG. 1).

Figure 4:
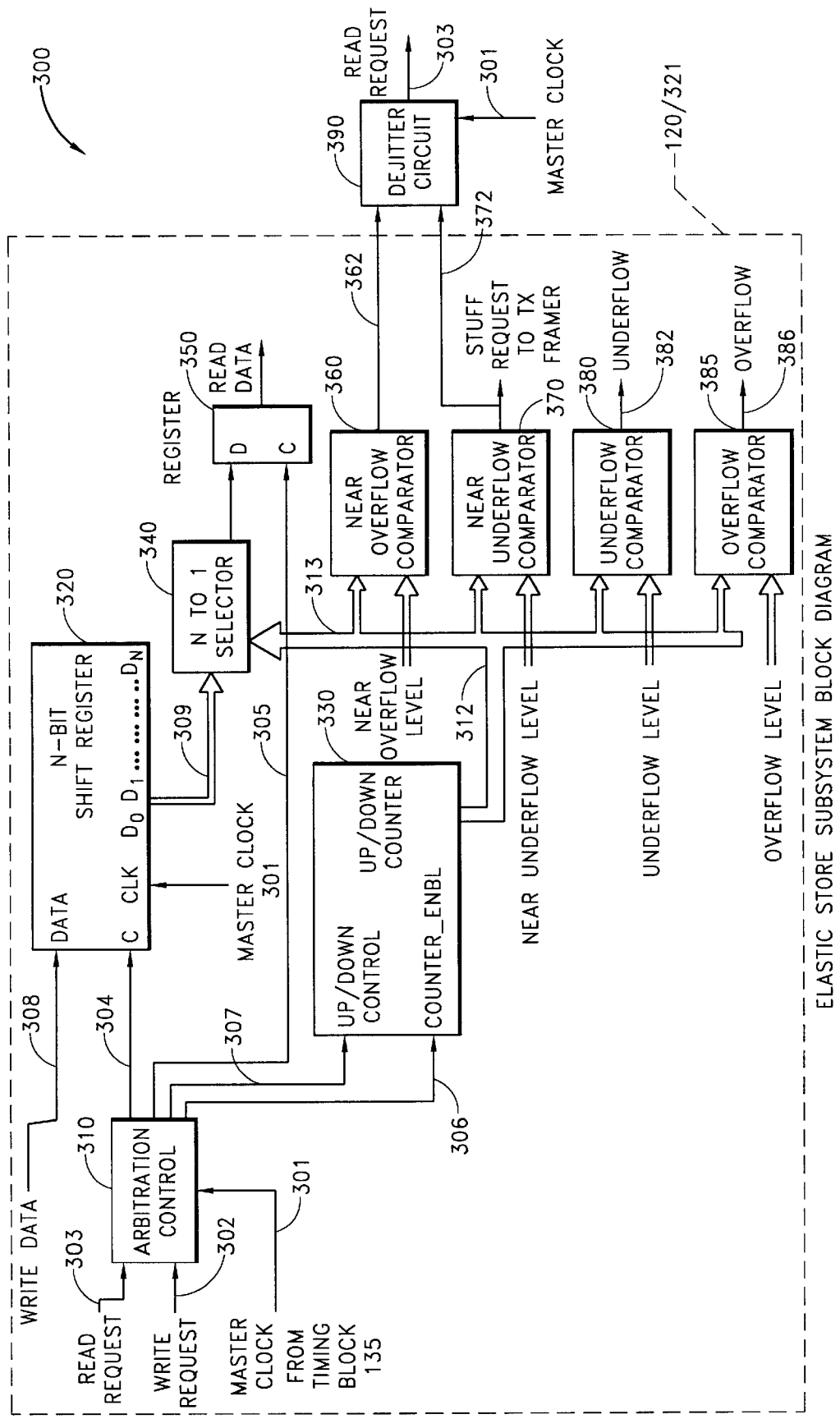
FIG. 4 is a functional block diagram depicting one embodiment of the elastic store system shown in FIG. 1.

Now referring to FIG. 4, a functional block diagram depicting one embodiment of the elastic store system 100 is shown. The elastic store system 100 includes the Tx Elastic Store subsystem 120 and the Rx Elastic Store subsystem 300.

One embodiment of the Tx Elastic Store subsystem 120 includes an elastic store module 321 having a shift register buffer that provides a way to buffer data which may be written into its input at a slightly lower rate than it is read from its output. Functions include generation of a stuff request, underflow status and overflow status. All inputs and outputs are sampled by a high speed clock, except RESET which is asynchronous. A Very high speed integrated circuit Hardware Description Language (VHDL) code listing for the major modules of the Tx Elastic Store subsystem 120 is provided in Appendix A.

One embodiment of the RX Elastic Store subsystem 300 includes the elastic store module 321 and a dejitter circuit 390. The RX Elastic Store subsystem 300 has similar characteristics to the Tx Elastic Store 120 with slight variations. Functions for the Rx Elastic Store 300 include generation of a "faster" control signal, a "slower" control signal, underflow status and overflow status. The dejitter circuit logic 390 uses the faster and slower controls to produce a read request signal for reading out the contents of the elastic store. All inputs and outputs are sampled by a high speed clock, except RESET which is asynchronous. A VHDL code listing for the major modules of the Rx Elastic Store subsystem 300 is provided in Appendix B.

Input and output signals for the elastic store module 321 are summarized in Table 1 below:

TABLE 1

| Input Signals | Output Signals |
| --- | --- |
| RESET | Read Data |
| Preset | Stuff Request (I/O) |
| Clock | Underflow Status (I/O) |
| Write Data (from Channelizer if TxEsto) | Overflow Status (I/O) |
| Write Request (From Channelizer if TxEsto) | |
| Read Request (from Framer if TxEsto) | |

Signals internal to the elastic store module 321 are listed in Table 2 below:

TABLE 2

| Signal Name | Significance |
| --- | --- |
| WR_RQ1 | Write Request 1 sampling register |
| WR_RQ2 | Write Request 2 sampling register |
| WR_RQ3 | Write Request 3 sampling register |
| WR_RQ_FLAG | Write Request Flag |
| WR_FLAG | Write Flag |
| RD_RQ1 | Read Request 1 sampling register |
| RD_RQ2 | Read Request 2 sampling register |
| RD_RQ3 | Read Request 3 sampling register |
| RD_RQ_FLAG | Read Request Flag |
| RD_FLAG | Read Flag |
| INIT_FLAG | Initialize Flag |
| LOLO_LIM | LoLo limit represents the Lowest low value for the Shift register pointer. Corresponds to the lowest significant bit within the shift register and indicates the Overflow condition |
| LO_LIM | Shift register pointer low limit. For Rx Elastic Store, this corresponds to read faster control. |
| HI_LIM | Shift register pointer high limit. This corresponds for Tx Elastic Store to Stuff limit and for Rx Elastic Store to read slower control. |
| HIHI_LIM | HiHi limit represents the High high value for the Shift register pointer. Corresponds to the most significant bit within the shift register and indicates the Underflow condition. |

The elastic store module 321 comprises an arbitration control block 310, a shift register block 320, a selector block 340, an Up/Down counter block 330, a register 350, a near overflow comparator 360, a near underflow comparator 370, an underflow comparator 380, an overflow comparator 385. In the Rx Elastic Store subsystem 300, a dejitter circuit 390 connects to the elastic store module 321.

Proper arbitration requires some sort of delay element or sampling clock with a shorter period than the read/write data. The arbitration latency may be three or more delays in order to detect read/write clock edges rather than levels and to eliminate metastability. The arbitration in one embodiment is done on the data bit interval. While other implementations are possible ( e.g., at the frame rate), the required resolution of the arbiter is still the read/write data interval. More significantly, arbitration on a bit by bit basis provides more responsive fast/slow controls for the dejitter circuit from the receive elastic store. In one embodiment, the dejittered output may be applied to a phase lock loop (PLL) which generates a smooth symmetrical read request multiple of the dejitter read request for multiplexing the read data from multiple Elastic Stores into a single high speed data stream which is synchronous with the transmit source. Thus, data rate arbitration eases the PLL's voltage controlled oscillator (VCO) stability requirement by providing faster update to the PLL.

The arbitration control block 310 has three inputs, namely a $Write_{13}$ Request signal 302 from the channelizer 110 (FIG. 1) in the case of the transmit elastic store 120 or from the Deframer 140 in the case of the receive elastic store 300; a Read_Request signal 303 from the framer 130 in the case of transmit elastic store 120 or from the dechannelizer 170 in case of the receive elastic store 300; and a Master Clock (MClk) 301(also referred to as a sampling clock). However, in the case of a T3/E3 communications system, the receive elastic store 321 obtains the $Read_{13}$ Request signal from a phase lock loop (PLL) 1550 (FIG. 15) connected to the dejitter circuit 390, or directly from the dejitter circuit 390 in the case of a T1/E1 system. The arbitration control block 310 controls the metastable condition by monitoring the read and write. A metastable condition is an undefined state (neither one nor zero) which arises as a result of sampling at the instant that the data is changing. The arbitration control block 310 utilizes the three Write Request X sampling registers and the three Read Request X sampling registers to control the metastable condition. The arbitration control block 310 generates several output signals, namely a Write Activate control signal 304, which is fed to the n-bit shift register 320, a Read Activate control signal 305, which is fed to the register 350, a counter enable signal 306 and an up/down control pointer signal 307, both of which are fed to the up/down counter block 330.

The n-bit shift register 320 (detailed in FIG. 3) has three inputs, namely a Write$_{13}$ Data signal 308, the Write Activate control 304 and a Master Clock 301 The Write_Data signal 308 is received from the channelizer 110 in the case of the transmit elastic store 120; or from the deframer 140 in the case of the receive elastic store 300. In addition, if the Write_Request signal 302 has more priority than the Read$_{13}$ Request signal 303, then at the activation of the Write Activate control 304 in conjunction with the Master clock, the data is right shifted (most significant bit to least significant bit) and the pointer 222 (FIG. 3) is moved to the right. However, if the Read_Request 303 is prior to the Write$_{13}$ Request 302, only the pointer 222 is moved to the left toward the most significant bit.

The N to 1 selector 340 selects one of the n-bit shift register bits at its input from the bus 309. This decision is carried out inside the selector block 340 and is based on the value of the up/down counter 330. The up/down counter 330 is controlled by the counter enable signal 306, the up/down control pointer 307 and the Master Clock 301 (not shown as an input). At the end of a Read cycle, the Read Activate control 305 clocks the data bit selected by the 1 to N selector 340 into the register 350. The value of a pointer 312 at the output of the up/down counter 330 is compared to a near overflow comparator 360 (this corresponds to Lo$_{13}$ LIM 230 in FIG. 3); a near underflow comparator 370 (this corresponds to Hi$_{13}$ LIM 228 in FIG. 3); an underflow comparator 380 (this corresponds to HiHi$_{13}$ LIM 224 in FIG. 3) and to an overflow comparator (which corresponds to LoLo$_{13}$ LIM 226 in FIG. 3). When the value of the up/down counter 330 is equal to the near overflow comparator 360, then a faster read signal 362 is generated for the receive elastic store 300 which goes into the dejitter circuit 390. However, if the value of the up/down counter 330 is equal to the near underflow comparator 370, a stuff request 372 is sent to the framer 140 for the transmit elastic store 120 and a slow read is generated for the receive elastic store 300. If the value of the up/down counter 330 is equal to the underflow comparator 380, the underflow flag 382 is set, and if the up/down counter 330 is equal to the overflow comparator 385, the overflow flag 386 is set.

Now referring to FIG. 5, a functional block diagram of one embodiment of the dejitter circuit 390 which is a part of the RxEsto 300 within the elastic store system 100 will be described. The RxEsto's Read$_{13}$ Request signal is typically recovered from the Master Clock using the dejitter circuit 390. The dejitter circuit 390 produces a symmetrical Read_Request 303 at its output which has the average frequency of the MClk at its input. This is accomplished by adjusting rate of the Read_Request 303 up or down according to near overflow and near underflow buffer pointer indicators. The Read_Request 303 provided by the dejitter circuit is also used by the receiver interface. Under normal operation, the RxEsto 300 will not underflow or overflow. However, the underflow signal 382 and the overflow signal 386 are provided for downstream error handling.

Figure 15:
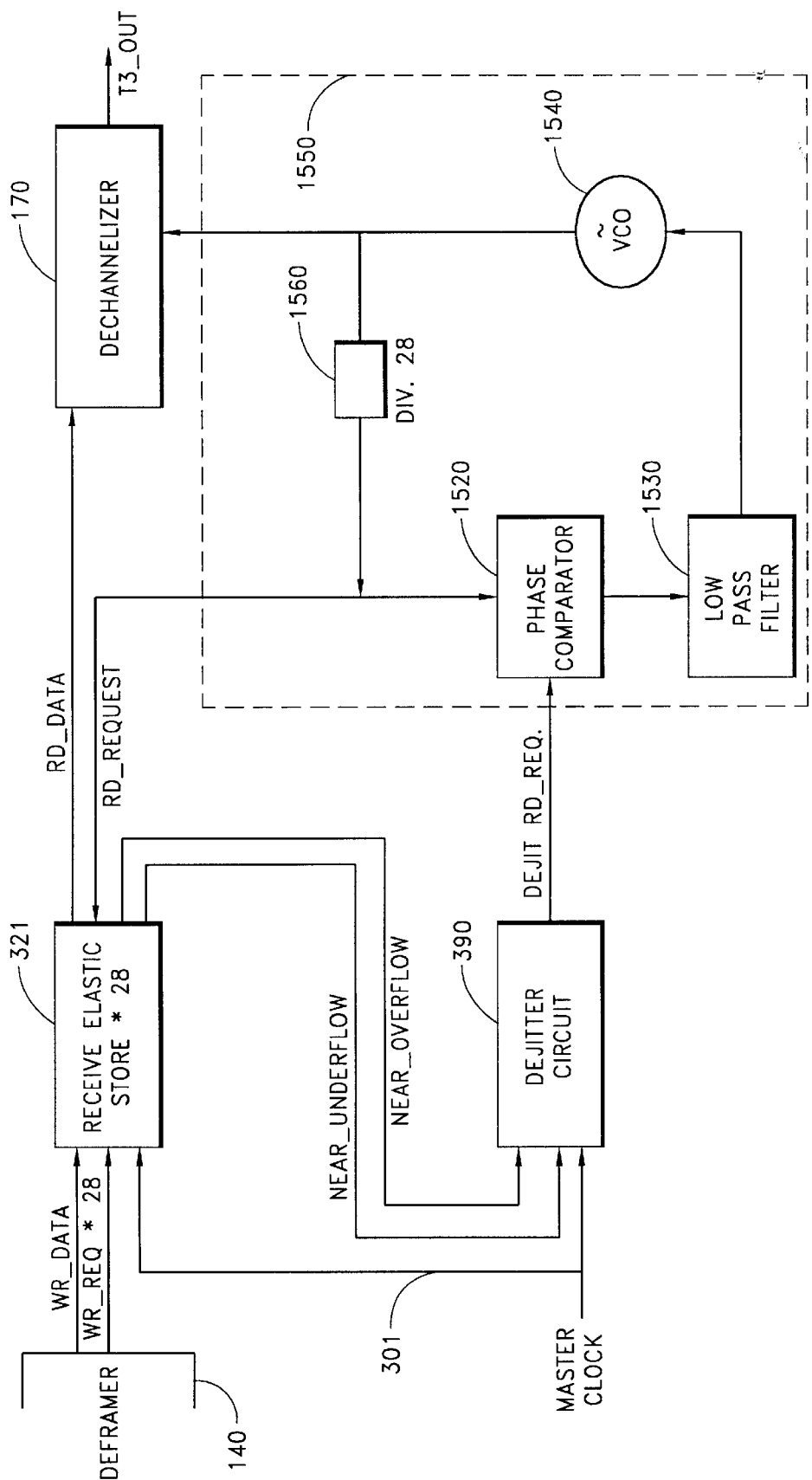
FIG. 15 is a block diagram showing exemplary dejitter circuit interconnections for a T3/E3 embodiment of the communication system receiver shown in FIG. 1.
Figure 16:
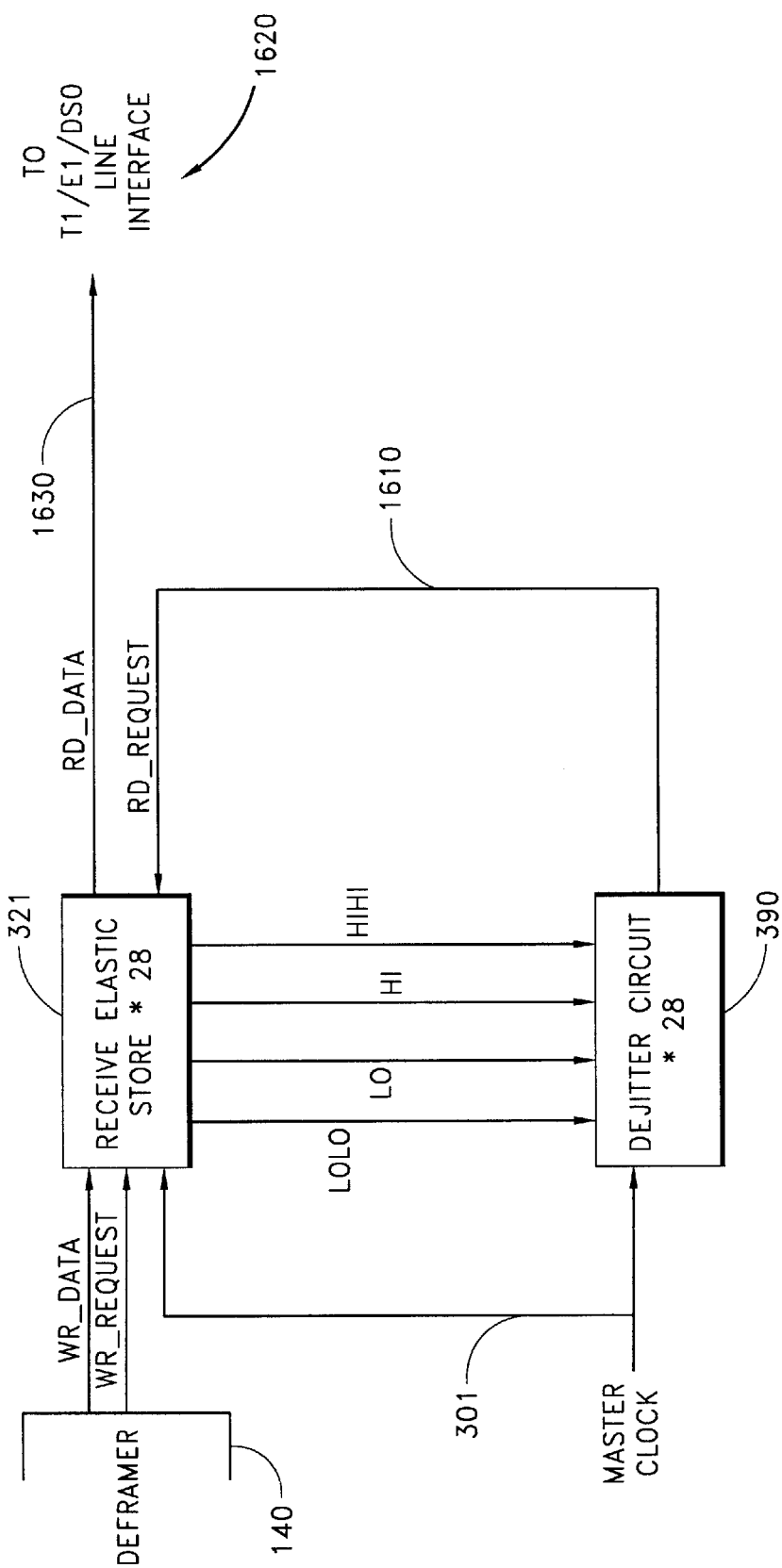
FIG. 16 is a block diagram showing exemplary dejitter circuit interconnections for a T1/E1 embodiment of the communication system receiver shown in FIG. 1.

The dejitter circuit 390 comprises a decision block 400, a counter selector block 405, a down counter block 410, a decoder block 420 and a flip-flop block 415. In the communication system 98 where multiple channels are utilized, in one embodiment, the dejitter circuit 390 is replicated for each channel of the system. For example, in an embodiment having 28 channels, there are 28 elastic stores 321 and 28 dejitter circuits 390, each of which have associated level signals and underflow/overflow signals as seen in FIGS. 4, 15 and 16.

Figure 14:
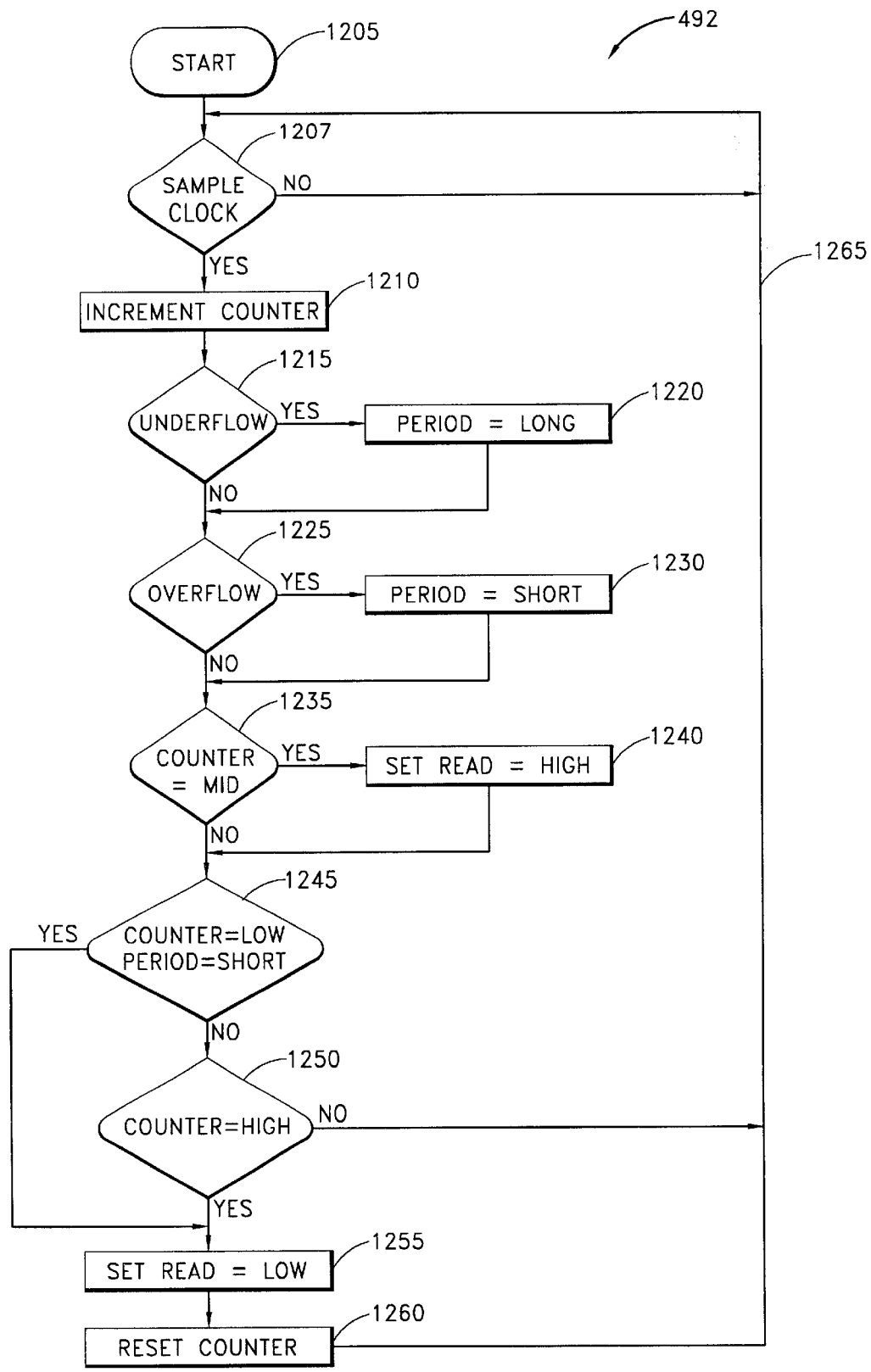
FIG. 14 is a flowchart of the receiver dejitter process shown in FIG. 6.

The decision block 400 receives two of its three inputs 425 from the receive elastic store 321 (FIG. 4). In one embodiment, the decision block 400 performs the functions of states 1215–1230 of Dejitter process 492 (FIG. 14). The inputs to decision block 400 are the Near underflow signal 372, the Near overflow signal 362 and the Master Clock (MClk) 301. The decision block 400 provides the selector input for the counter selector block 405 to determine which value count of inputs 440 will be used depending on the inputted signals from the Rx elastic store 321. Once this decision is made, it is fed into the counter selector block 405 via SEL signal 430. The count selector block 405 selects the value for count from the inputs 440 which is then fed to the count input of the down counter block 410.

The count value used by count select block 405 is calculated by the following formula:

$$n = \left( \frac{Total\,number\,of\,MCLk\,per\,frame}{Total\,length\,of\,data\,within\,the\,frame} \right) * number\,of\,channels$$

This corresponds to the nominal value, in other words, if everything is perfect. However, if a stuffing bit happens at Tx, then count is equal to:

$$n = \left( \frac{Total\,number\,of\,MCLK\,per\,frame}{Total\,length\,of\,data\,within\,the\,frame - 1} \right) * number\,of\,channels$$

Another case where the value of count can vary is when the MClk frequency of the receiver is positively biased relative to the transmitter: ** If stuffing happened at Tx:

$$n = \left( \frac{Total\,number\,of\,MCLK\,per\,frame + 1}{Total\,length\,of\,data\,in\,the\,frame} \right) * number\,of\,channels$$

** If stuffing happened at Tx:

$$n = \left( \frac{Total\,number\,of\,MCLK\,per\,frame + 1}{Total\,length\,of\,data\,in\,the\,frame - 1} \right) * number\,of\,channels$$

Yet another case where the value of count can vary is when the MClk frequency of the receiver is negatively biased relative to the transmitter:
** If no stuffing happened at Tx:

$$n = \left( \frac{Total\,number\,of\,MCLK\,per\,frame - 1}{Total\,length\,of\,data\,in\,the\,frame} \right) * number\,of\,channels$$

** If stuffing happened at Tx:

$$n = \left( \frac{Total\,number\,of\,MCLK\,per\,frame - 1}{Total\,length\,of\,data\,in\,the\,frame - 1} \right) * number\,of\,channels$$

From the above values, the range of values over which the count of MClk per bit corresponds to the integer average. This is illustrated by an example for the T3 case:

In one embodiment, each chip corresponds to 2 * MClk cycle rate. There are two branches (an I branch and a Q branch) and 14 channels per branch. Therefore, 2 * MClk * 14=28 * MClk per transmitted data bit. Because of the overhead bits (in this case 7 bits (2 preamble, 1 signaling, 3 justify and 1 stuffing)), only 192 data bits are transmitted out of a total of 198 bits. Therefore, the nominal value which corresponds to the number of MClk cycles in a T3 data interval is equal to:

$$nominal value = \left(\frac{198}{192}\right) * 28 = 28.875.$$

However, Stuffing might happen at Tx. Therefore, only 191 data bits out of 198 are transmitted. Thus:

$$Count = \left(\frac{198}{191}\right) * 28 = 29.026$$

If the Rx MClk frequency is positively biased, then there is 199 * MClk per frame. Thus: If No Stuffing, then $$Count = \left(\frac{199}{192}\right) * 28 = 29.0208$$

Else If Stuffing, then $$Count = \left(\frac{199}{191}\right) * 28 = 29.1728$$

If the Rx MClk frequency of Rx is negatively biased then 197 * MClk per frame Thus: If No Stuffing, then $$Count = \left(\frac{197}{192}\right) * 28 = 28.729$$

Else If Stuffing, then $$Count = \left(\frac{197}{191}\right) * 28 = 28.88$$

From the above, the range of values for a T3/E3/DS3 system over which the count of MClk per bit can vary is: 28.729 to 29.173. Since only integer values can be used for MClk, the range is then equal to: 28 to 30. Furthermore: since zero is used in the counting, then count values are in the range of 27 to 29.

In one embodiment, these values are hard coded in the logic implementation. In other words, they are calculated following this method and then only the results (in this case, 27 to 29) are utilized for the logic design.

The down counter block 410 (FIG. 5) starts from the reset state and keeps counting the master clock (MClk) pulses. Inside the down counter block 410, the count value is input from the counter selector block 405. A terminal count (Tc) is the output from the down counter block 410 to reset the pulse when it is equal to zero, and thus a LOAD signal is fed back to a LOAD input of the down counter block 410. At the same time, the flip-flop block 415 is set. The down counter 410 communicates with the decoder block 420 which decodes the value of the counter received. When the counter's value is equal to n/2, it resets the flip-flop 415. The variable n refers here to the number of channels utilized by the system 98, e.g., 28 channels in one embodiment.

Figure 5:
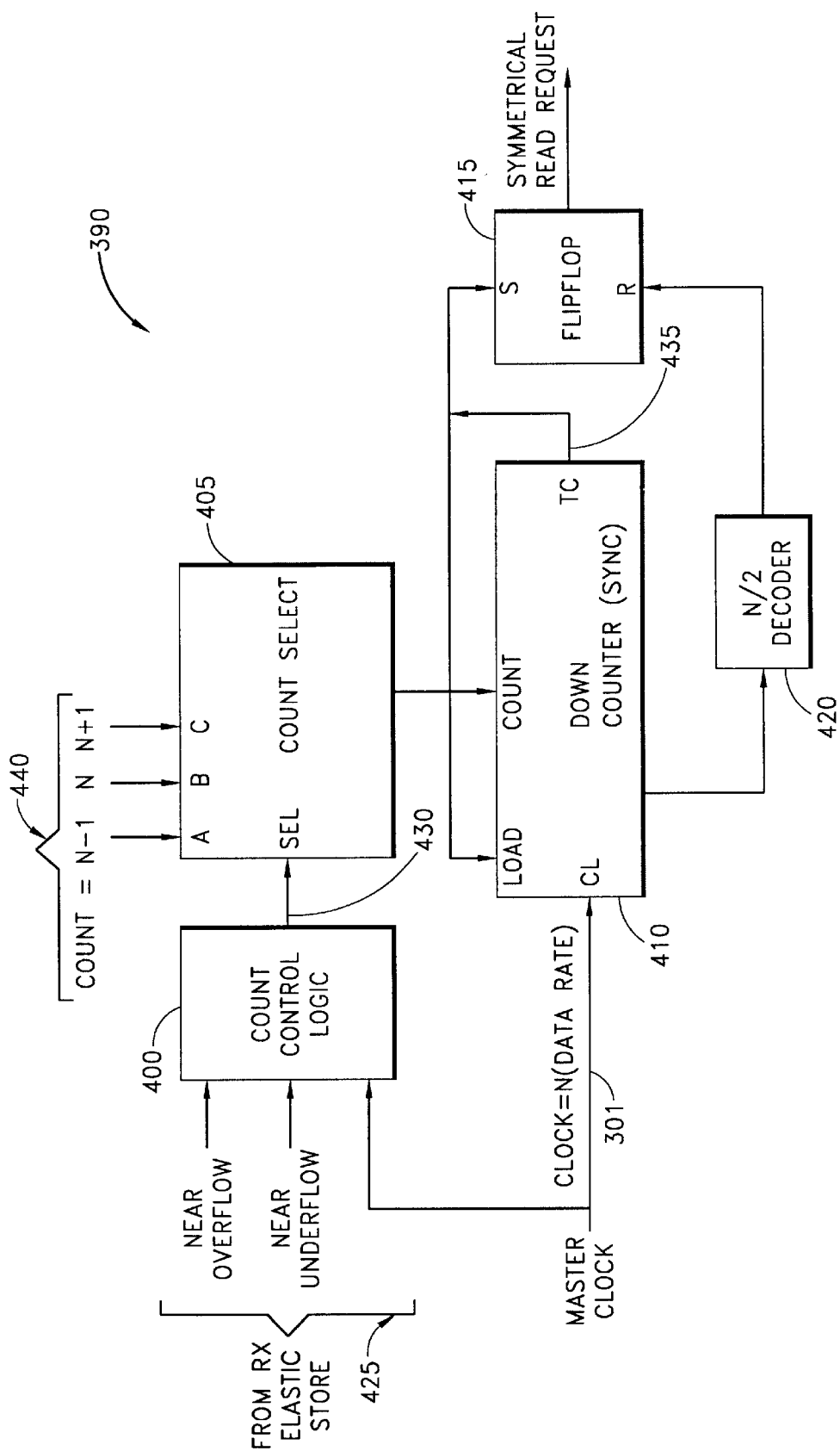
FIG. 5 is a functional block diagram of the receiver dejitter circuit used in the elastic store system shown in FIG. 4.

FIG. 5 shows the concept behind the digital dejitter circuit 390 used in one embodiment. However, for the preferred embodiment, a slight change is made when implementing the dejitter circuit for a T3/ E3/ DS3 system (further described in conjunction with FIG. 15 below) and the dejitter circuit for a T1/E1/DS1 system (further described in conjunction with FIG. 16 below) because the destination of the dejitter output is different in each case.

Figure 6:
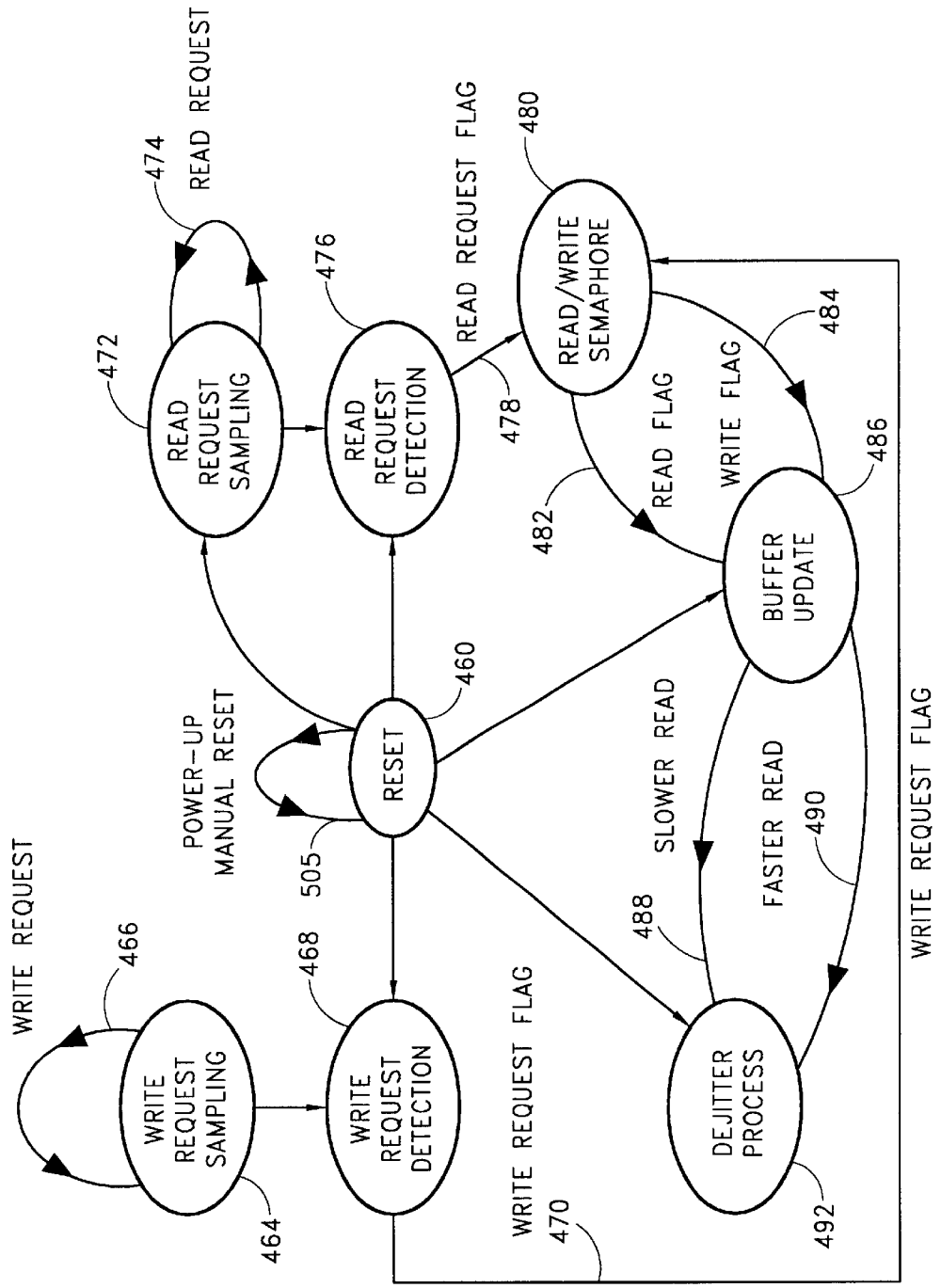
FIG. 6 is a state machine diagram illustrating the process flow for the elastic store system shown in FIG. 1.

FIG. 6 shows a state machine diagram for the TxEsto and RxEsto subsystems within the elastic store system 100. The process states comprise a Reset process 460 (FIG. 7), a Write request anti-metastable sampling process 464 (FIG. 8), a Write request detection process 468 (FIG. 9), a Read request anti-metastable sampling process 472 (FIG. 10), a Read request detection process 476 (FIG. 11), a Read/Write semaphore process 480 (FIG. 12), a Buffer update process 486 (FIG. 13a, 13b), and for the RxEsto subsystem only, a dejitter circuit process 492 (FIG. 14). The inputs to each process of FIG. 6 are sampled by the master clock, whereas communication between processes is via flags and registers.

1. RESET process [FIG. 7]

Figure 7:
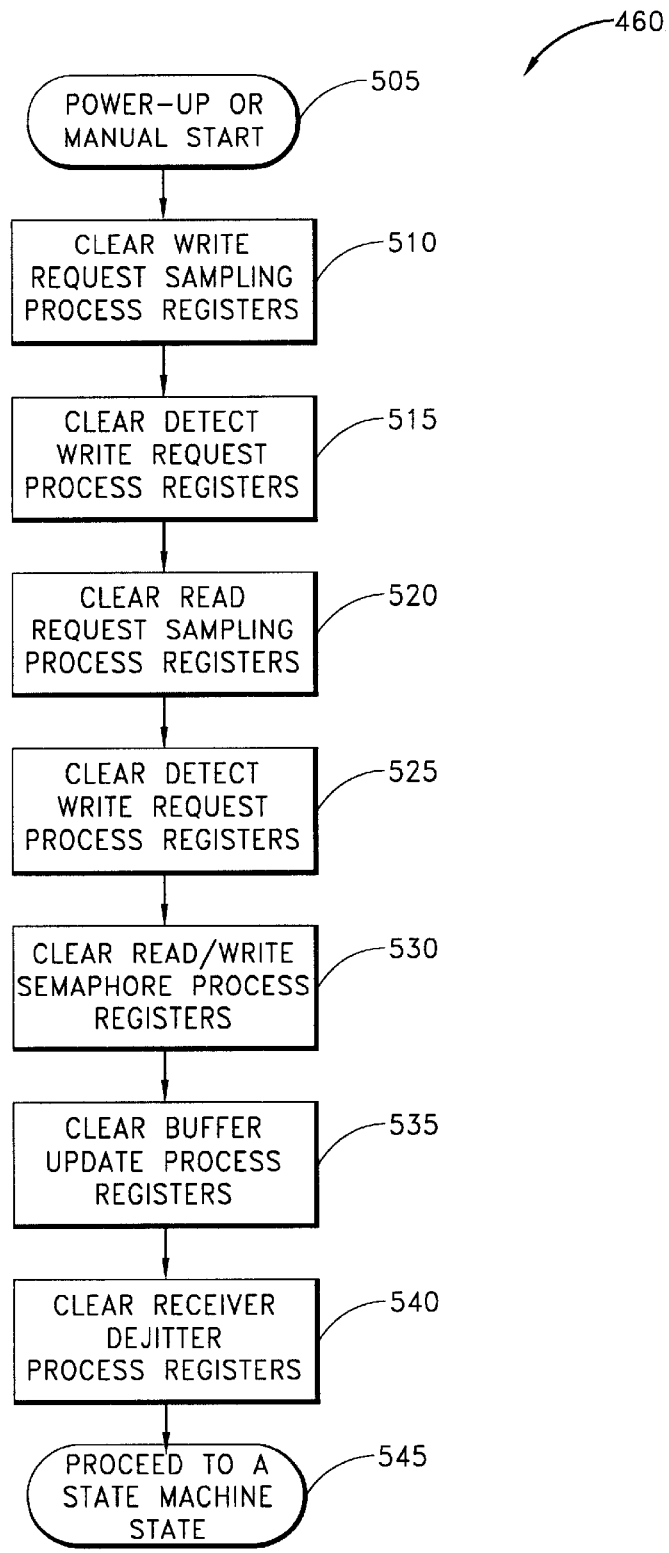
FIG. 7 is a flowchart of the Reset process shown in FIG. 6.

Now referring to FIG. 7, the RESET process 460 is described. The RESET process 460 is triggered when a power up or a manual reset state 505 is started. The following tasks are then carried out simultaneously: clear write request sampling registers 510, clear detect Write request and process registers 515, clear Read request sampling and process registers 520, clear detect Read Request and process registers 525, clear Read/Write semaphore and process registers 530, clear Buffer update and process registers 535, and clear Receiver Dejitter and process registers 540. Once these tasks are finished, process 460 enters state 545 to proceed to a state machine state of FIG. 6. The state 510 corresponds to setting WR__RQ1, WR__RQ2 and $WR_{13}$ RQ3 signals to zero. Clearing detect Write Request registers at state 515 corresponds to setting the Write request Flag ($WR_{13}$ $RQ_{13}$ FLAG) to zero. Furthermore, clearing Read request sampling process registers at state 520 corresponds to setting $RD_{13}$ RQ 1, $RD_{13}$ RQ2 and RD__RQ3 signals to zero. State 525 corresponds to clearing the Read request flag by setting $RD_{13}$ $RQ_{13}$ FLAG to zero. The Clear Read/Write semaphore state 530 corresponds to setting both Read and Write Flags to zero. Clearing Buffer update state 535 corresponds to clearing the initialize flag (INIT__Flag set to zero), clearing the shift register pointer (SR-PTR set to zero), clearing the shift register buffer (SR(11 to 0) set to zero), clearing the read data ($RD_{13}$ DATA set to zero), clearing the stuff request and clearing both underflow and overflow status. The clear receiver dejitter process registers state 540 corresponds to clearing the counter and clearing both "read faster" and "read slower" status.

2. Write Request Anti-metastable Sampling process [FIG. 8]

Figure 8:
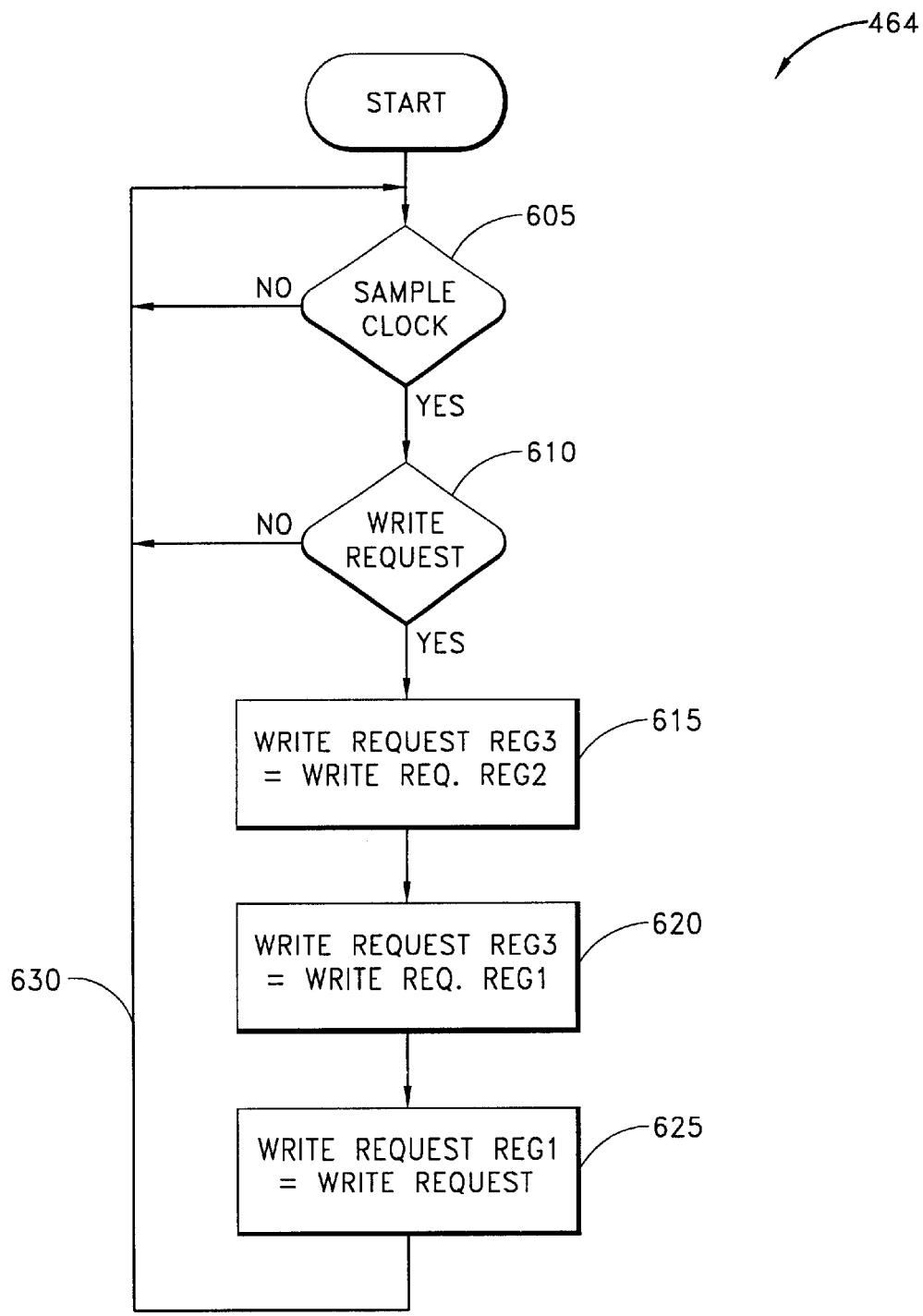
FIG. 8 is a flowchart of the Write request anti-metastable sampling process shown in FIG. 6.

Referring to FIG. 8, the Write Request Anti-metastable Sampling process 464 will be described. Process 464 has three parameters namely: RESET, CLOCK and WR__RQ signals. The initial task performed by the process 464 is to check for RESET. If RESET is set to one, the $WR_{13}$ RQ1, $WR_{13}$ RQ2 and WR__RQ3 signals are cleared. Otherwise, a test is carried out at state 605 to check for CLOCK. If CLOCK is set to one, then a test for an active state of write request ($WR_{13}$ RQ) is made at state 610. If WR__RQ is active, then process 464 samples Write Request 2 at state 615, samples Write Request 1 at state 620 and samples Write Request at state 625. Once these tasks are carried out, a loop 630 is entered where the process 464 goes back to state 605 to wait for the next Clock event to happen.

3. Write Request Detection process [FIG. 9]

Figure 9:
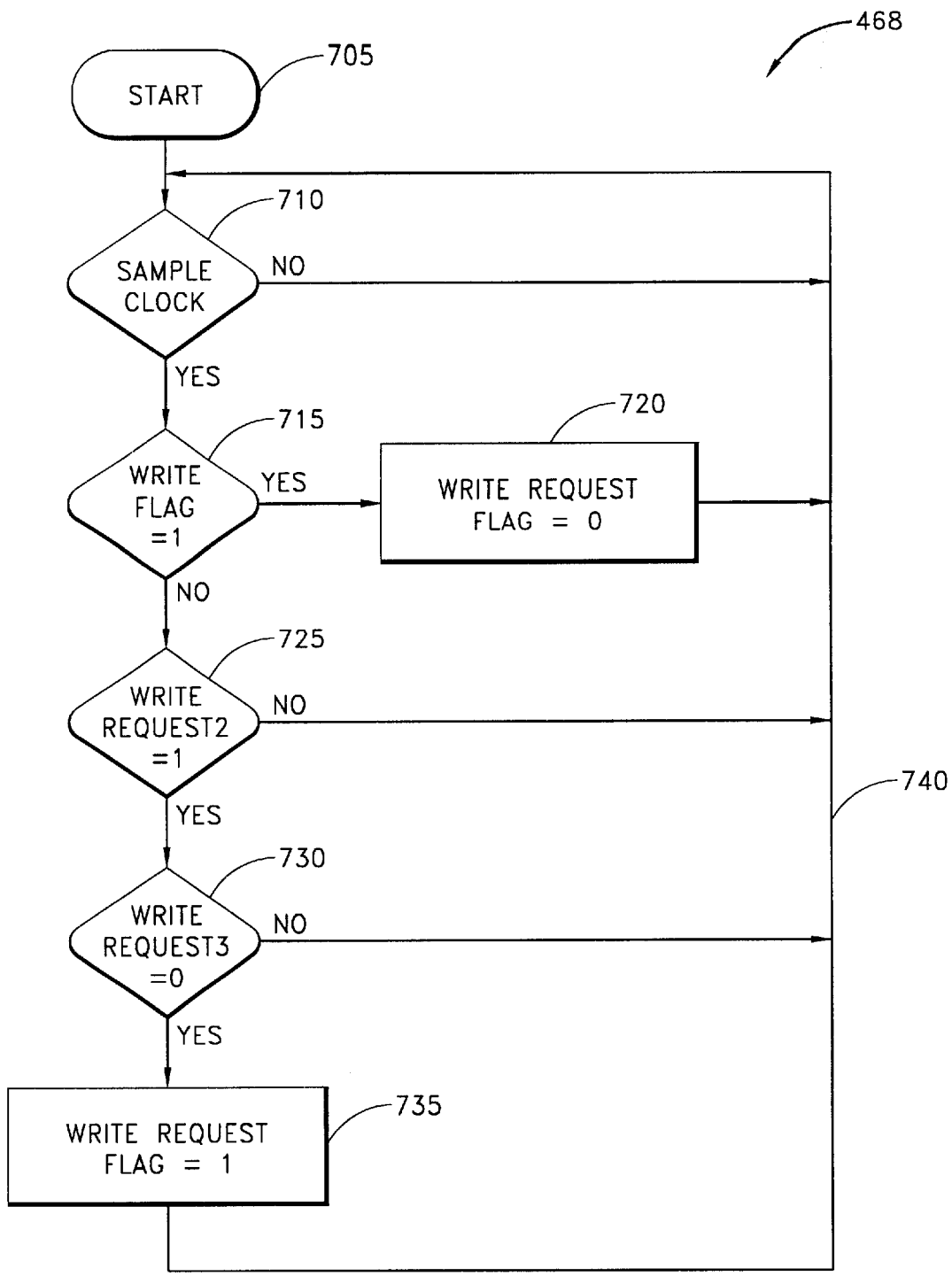
FIG. 9 is a flowchart of the Write request detection process shown in FIG. 6.

Referring to FIG. 9, the Write Request Detection process 468 will be described. Process 468 has two parameters, namely: RESET and CLOCK. The first task carried out by this process is to check for RESET. If the RESET signal is set to one, the write request flag (WR_RQ$_{13}$ FLAG) is cleared. This leads to the Start state 705 followed by a decision state 710 where a test is carried out to check for a CLOCK event. If CLOCK is sampled (CLOCK=1) then process 468 checks if the write flag is cleared at decision state 715. If the WR$_{13}$ FLAG is not cleared (set to 1 in this case), then process 468 clears the write request flag at state 720. However, if the WR$_{13}$ FLG is cleared, as determined at decision state 715, then process 468 detects a write request transition at decision states 725 and 730. If write request 2 is equal to one, as determined at decision state 725 and write request 3 is equal to zero, as determined at decision state 730, then process 468 sets the write request flag at state 735. In any other case and after all the above tasks were carried out, the process enters a loop 740 where the write request detection process 468 goes back to state 710 waiting for the next Clock event.

4. Read Request Anti-metastable Sampling process [FIG. 10]

Figure 10:
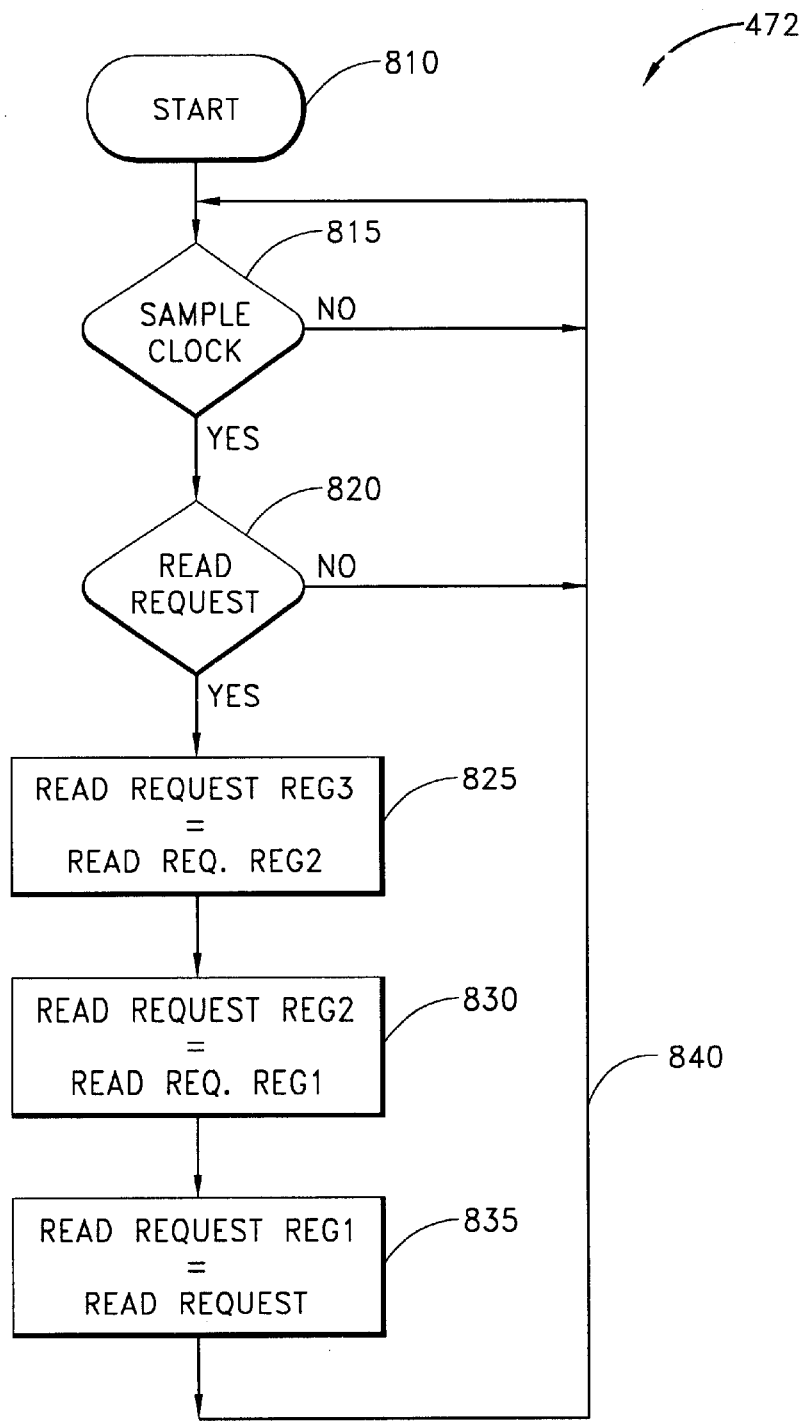
FIG. 10 is a flowchart of the Read request anti-metastable sampling process shown in FIG. 6.

Referring to FIG. 10, the Read Request Anti-metastable Sampling process 472 will be described. Process 472 has three parameters, namely: RESET, CLOCK and RD$_{13}$ RQ. The first transition carried out by this process is to check for RESET. If RESET is detected by the process 472, then all the Read Request (1, 2, and 3) Sampling Registers are cleared. This leads to the Start state 810 followed by a decision state 815 where a test is carried out to check for a CLOCK event. If CLOCK is sampled (CLOCK=1), then process 472 checks if a Read Request is received at decision 820. If a Read Request is received, then process 472 samples Read Request 2 by setting RD$_{13}$ RQ3 to RD_RQ2 at state 825, samples Read Request1 by setting RD$_{13}$ RQ2 to RD$_{13}$ RQ1 at state 830 and samples Read Request by setting RD$_{13}$ RQ1 to RD_RQ at state 835. Once these tasks are carried out, the process 472 enters a loop 840 waiting for the next event clock at state 815.

5. Read Request Detection process [FIG. 11]

Figure 11:
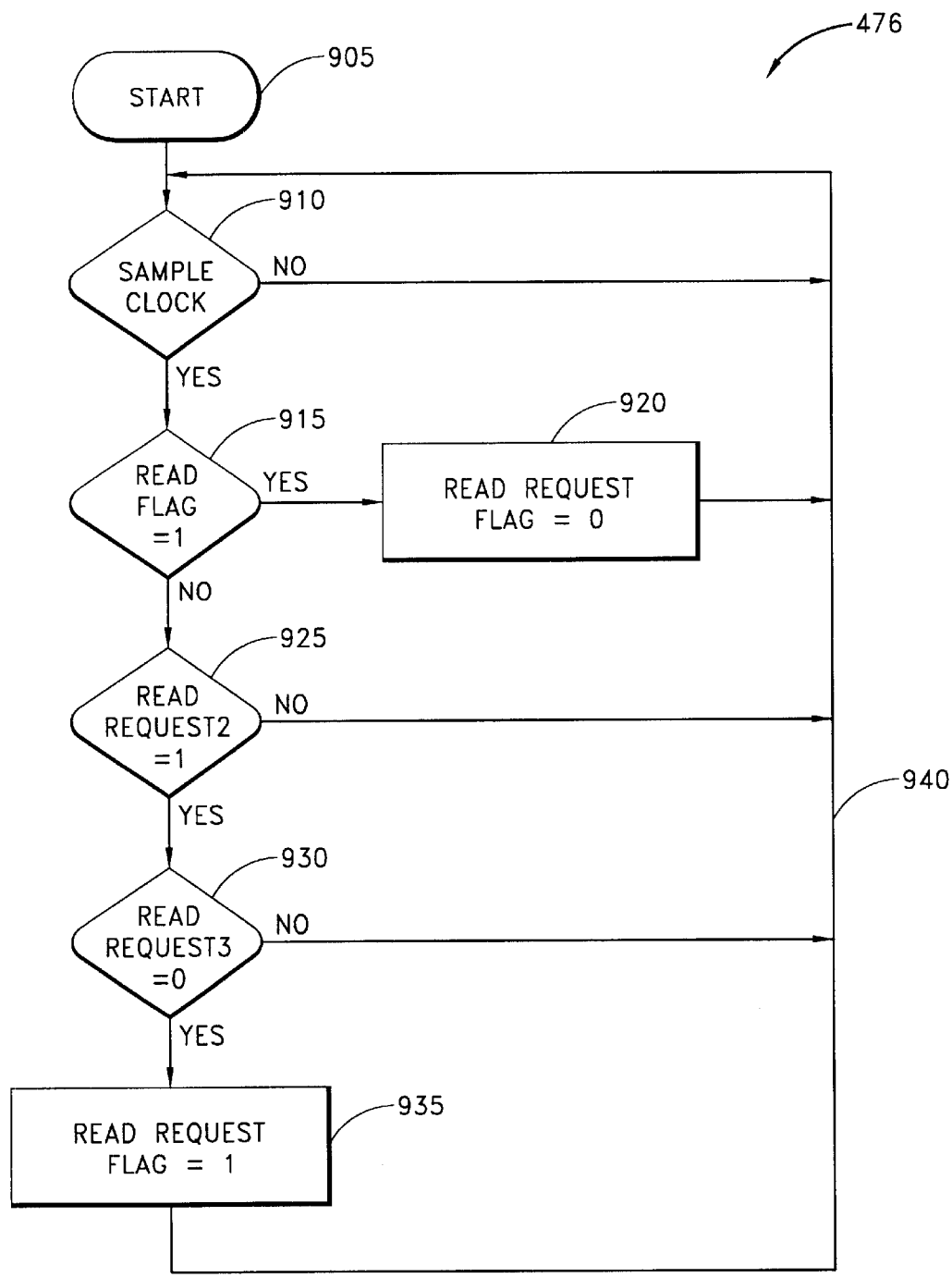
FIG. 11 is a flowchart of the Read request detection process shown in FIG. 6.

The Read Request Detection process 476 described in FIG. 11 has two parameters, namely: RESET and CLOCK. The first task carried out by this process is to check for RESET. If the RESET signal is set to one, the read request flag (RD$_{13}$ RQ$_{13}$ FLAG) is cleared. This Leads to the Start state 905 where a test is carried out to check for a CLOCK event. If CLOCK is sampled (CLOCK=1) at state 910, then process 476 checks if the read flag is cleared at decision state 915. If the RD$_{13}$ FLAG is set to one, as determined at decision state 915, then process 476 clears the read request flag at state 920. However, if the RD$_{13}$ FLG is cleared, as determined at decision state 915, then process 476 detects a read request transition at decision states 925 and 930. If read request 2 is equal to one, as determined at decision state 925 and read request 3 is equal to zero, as determined at decision state 930, then process 476 sets the read request flag at state 935. In any other case and after all the above tasks were carried out, the process 476 enters a loop 940 waiting for the next clock event at state 910.

6. Read/Write Semaphore process (sampled Arbiter) [FIG. 12]

Figure 12:
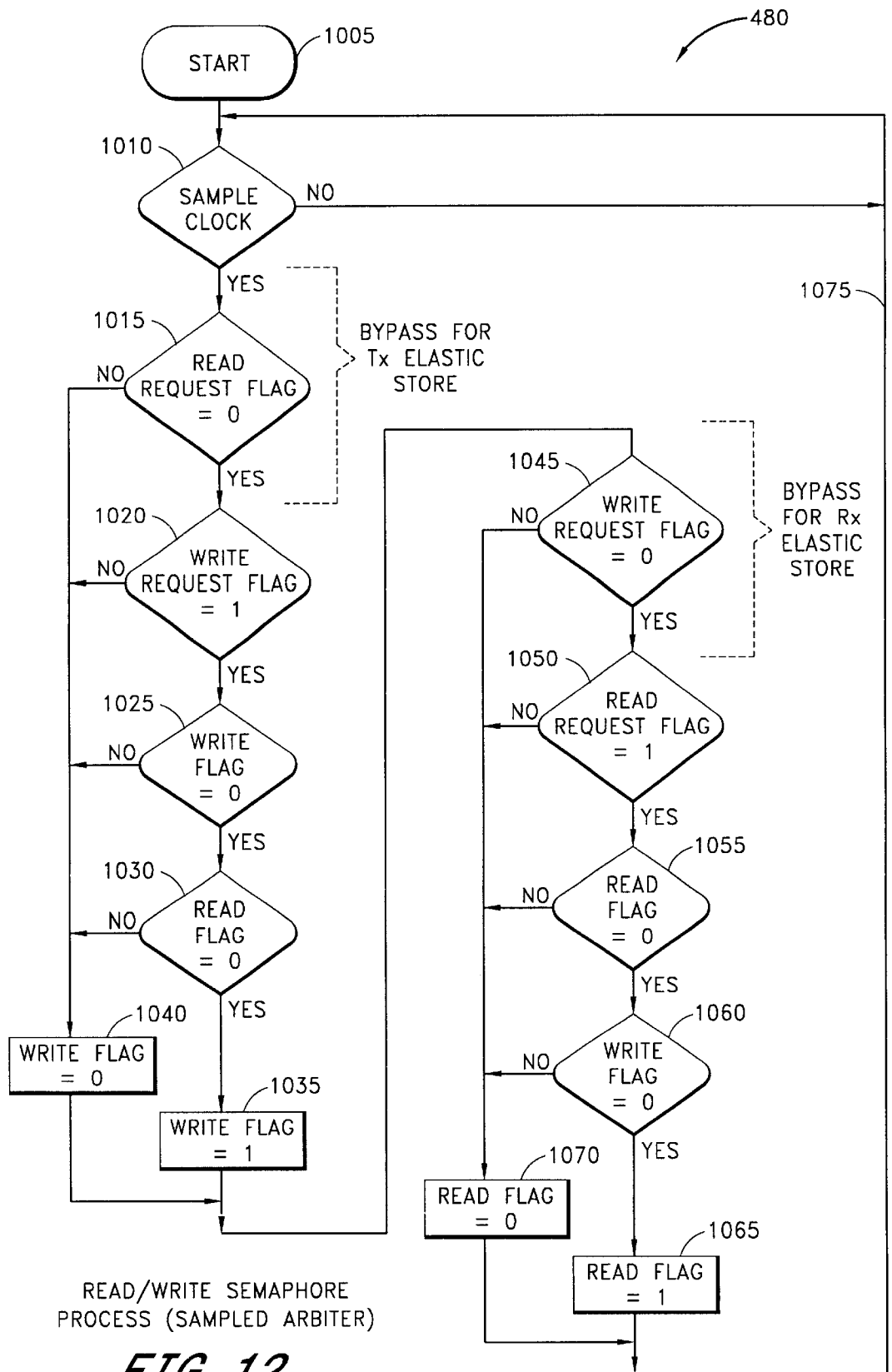
FIG. 12 is a flowchart of the Read/Write Semaphore process (Sampled Arbiter) shown in FIG. 6.

Referring to FIG. 12, the Read/Write Semaphore process 480 will be described. The process 480 has two parameters, namely: RESET and CLOCK. Before entering the START state 1005, a test is carried out to check for RESET. If the RESET signal is set to one, both write and read flags are cleared. Process 480 moves from the START state 1005 to a decision state 1010 wherein a test to check for clock event is carried out. If the CLOCK signal is sampled (in other words, if it is set to one), then process 480 checks the status of the read request flag at decision state 1015. If the read request flag is set to zero, process 480 continues at a decision state 1020 to determine the status of the write request flag. If the write request flag is set to one as determined at decision state 1020 and both write and read flags are set to zero at decision states 1025 and 1030, respectively ; the write flag is set to one at state 1035. Otherwise, if the read request flag is set to one as determined at decision state 1015, the write request flag is set to zero as determined at decision state 1020 and either the read flag or the write flag are set to one at decision states 1030 and 1025 respectively, then process 480 sets the write flag to zero at state 1040. Afterwards, in both cases, if the write request flag is set to zero as determined at decision state 1045, if the read request flag is set to one at decision state 1050, and both the read and the write flags are set to zero at decision states 1055 and 1060 respectively; then process 480 sets the read flag to one at state 1065. Otherwise, process 480 sets the read flag to zero at state 1070. Once these settings have taken place, the read/write semaphore process 480 enters a loop 1075 to wait for an clock event to take place as determined at state 1010. It is necessary to note that the test carried out at decision state 1015 is bypassed for the transmit elastic store 120 so that the write request has priority over the read request. Furthermore, the test carried out at decision state 1045 is bypassed for the receive elastic store 300 so that the read request has priority over the write request.

7. Buffer Update process [FIGS. 13a and 13b]

Figures 13, 13A:
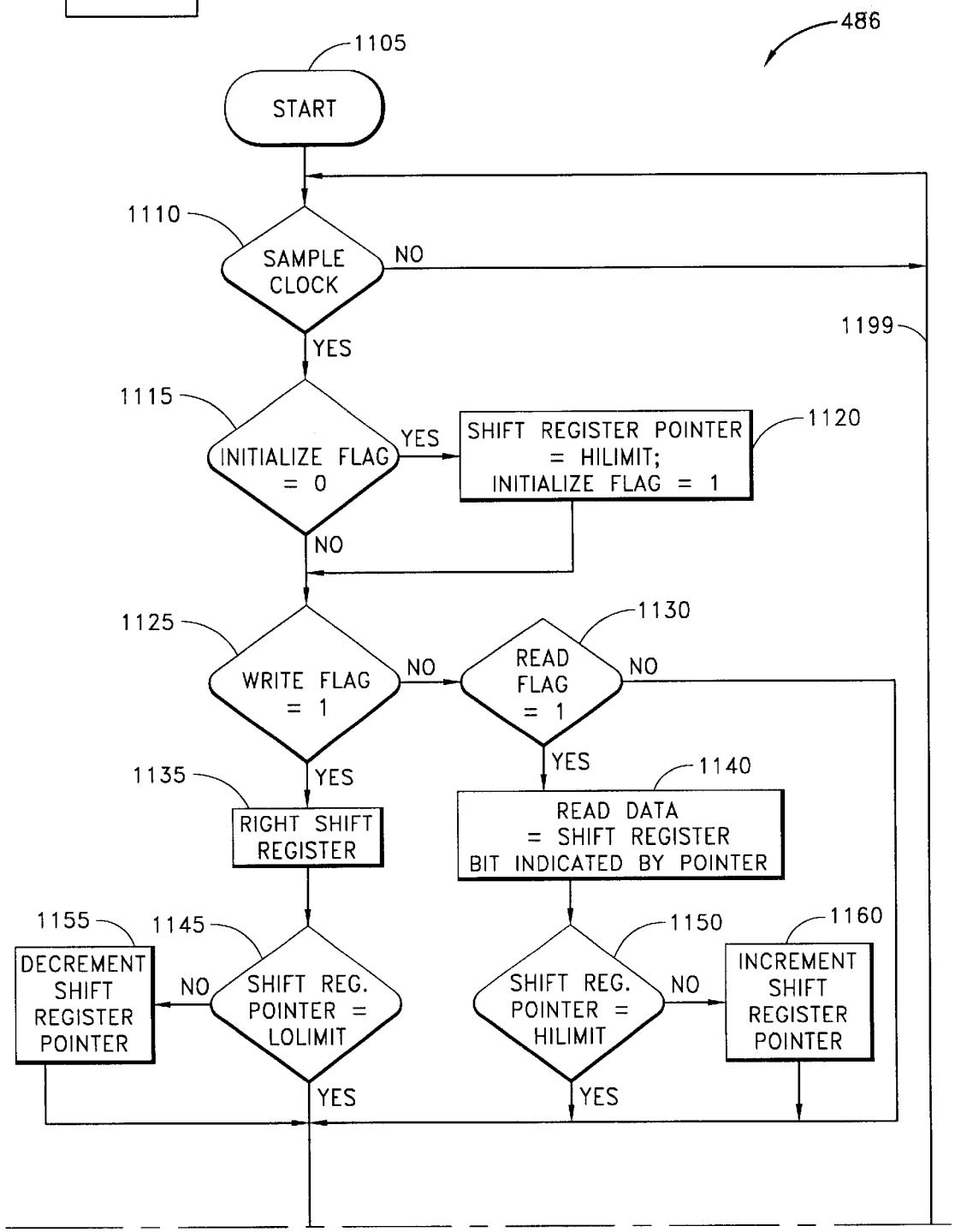
FIGS. 13a and 13b are a flowchart of the Buffer update process shown in FIG. 6.
Figure 13B:
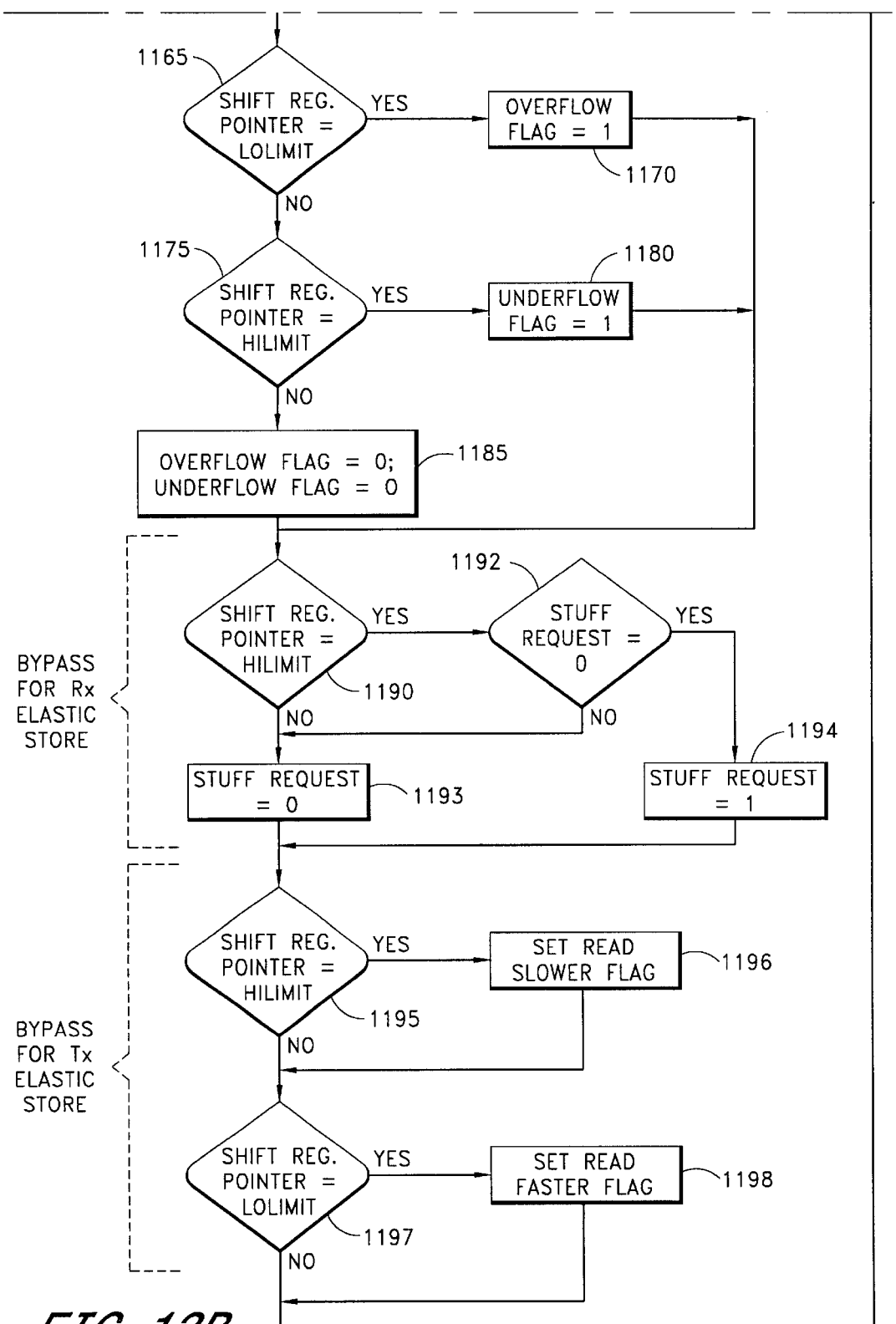

Referring to FIGS. 13a and 13b, and also FIG. 3 and 4, the Buffer Update process 486 will be described. Process 486 has ten parameters and one variable, namely: RESET, CLOCK, Write$_{13}$ Data, Shift Register, Shift Register Pointer, Stuff, Underflow and Overflow, and a pointer varying from 0 to 15. Before the buffer update process 486 enters the START state 1105, a test to check for RESET is performed. If RESET is set to one, then process 486 clears the Initialize flag by setting its value to zero, clears the pointer variable 222 by setting it to zero, clears the shift register 320 shown in FIGS. 3 and 4 by setting the value of its twelve bits (for the transmit elastic store 120) to zero, clears the read data by setting its value to zero, clears the stuff request by setting it to zero and clears the underflow and overflows status by setting their values to zero.

Once these settings have taken place, the buffer update process 486 moves from the START state 1105 to a decision state 1110 to check for a clock event. If the clock is set to one and the initialize flag (INIT_Flag) is set to zero at decision state 1115, then process 486 initializes the shift register pointer 222 (FIG. 3) to Hi$_{13}$ LIM 228 and sets the INIT$_{13}$ Flag to one at state 1120. A test is then carried out to check for the write flag at decision state 1125. If the write flag is set to one, as determined at decision state 1125, then process 486 shifts the shift register 320 to the right at state 1135. Furthermore, process 486 checks for shift register overflow at decision state 1145. If the pointer 222 is not equal to Lo$_{13}$ LIM 226 as determined at decision state 1145, process 486 decrements the pointer 222 at state 1155. Otherwise, if the write flag is set to zero, as determined at decision state 1125, and the read flag is set to one at decision state 1130, then process 486 moves to state 1140 to obtain read data from the shift register bit indicated by the pointer 222. Proceeding to a decision state 1150, process 486 checks for shift register underflow. If the pointer 222 is not equal to HiHi$_{13}$ LIM 224 at decision state 1150, the pointer 222 is incremented and the read data is updated at state 1160. Once these tests are carried out or if the read flag is equal to zero, as determined at decision state 1130, if the pointer is equal to $Lo_{13}$ LIM, as determined at decision state 1145, or if the pointer is equal to $HiHi_{13}$ LIM, as determined at decision state 1150, the process 486 updates the shift register pointer 222 and moves to decision state 1165.

A check for shift register overflow is then carried out at decision state 1165. If the pointer PTR 222 (FIG. 3) is equal to $LoLo_{13}$ LIM 226 as determined at decision state 1165, then process 486 sets the overflow flag to one at state 1170. Otherwise, if the shift register pointer PTR 222 is equal to $Hi_{13}$ LIM 228 as determined at decision state 1175, the underflow flag is set to one at state 1180. However, if the shift register pointer 222 is not equal to Hi__LIM 228, as determined at decision state 1175, then process 486 clears both overflow and underflow flags at state 1185. Proceeding to decision state 1190 on FIG. 13*b,* process 486 determines if the shift register pointer PTR 222 is equal to HI__LIM 228 and if the stuff request is set to zero at decision state 1 192. If so, then process 486 sets the stuff request to one at state 1194. Otherwise, if the pointer PTR 222 is not equal to $Hi_{13}$ LIM 228, as determined at decision state 1190, or the stuff request (STF) is not set to zero at decision state 1192, then process 486 clears the stuff request at state 1193.

It is necessary to note that the test regarding the stuff request (states 1190–1192) is carried out only for the Transmit Elastic Store 120, whereas for the Receive Elastic Store 300, the process 486 carries out the tests at states 1195–1197. If the shift register pointer 222 is equal to $Hi_{13}$ LIM 228 at decision state 1195, then process 486 sets the read slower flag at state 1196. Otherwise, if the shift register pointer 222 is not equal to $Hi_{13}$ LIM 228, as determined at decision state 1195, but is equal to $LO_{13}$ LIM 230 at decision state 1197, then process 486 sets the read faster flag at state 1198. In any case, at the completion of state 1193 or 1194 for the Transmit Elastic Store 120, or states 1198 and/or 1197 for the Receive Elastic Store 300, the process 486 enters a loop 1199 waiting for the next clock event at decision state 1110 (FIG. 13*a*).

8. Dejitter Circuit Process [FIG. 14]

Referring to FIG. 14, the Dejitter process 492 will be described. The Dejitter process 492 carries out a test to check for RESET before it enters START state 1205. If RESET is set to one, the dejitter process 492 clears all its parameters and sets the period to short (period corresponds to the amount of time the $Read_{13}$ Request is high). At the Start transition, if a clock event has occurred at decision state 1207, the dejitter counter 410 (FIG. 5), which is used to count the Master Clock (MClk) cycles, is incremented at state 1210. A test is then carried out to test if an underflow status has occurred at decision state 1215. If so, the period is set to a longer value (Long) at state 1220, which corresponds to a slower read. Otherwise, if underflow has not occurred, as determined at decision state 1215, process 492 checks if an overflow status has occurred at decision state 1225. If so, then process 492 sets the period to a short value at state 1230 (this corresponds to a faster read).

Otherwise and in both cases, a test is carried out to check the value of the counter 410 at decision state 1235. If the counter 410 is equal to MID (which in one embodiment corresponds to the value fourteen) at decision state 1235, then process 492 sets the Read__Request signal to one (high) at state 1240. Otherwise and in both cases, a test to check the value of the counter 410 and if an overflow had occurred previously (indicated by period=short) is performed at decision state 1245. If the counter 410 is equal to a $low_{13}$ value as determined at decision state 1245 (which in one embodiment is set to 28) and if an overflow has occurred, then process 492 sets the Read__Request to zero (low) at state 1255. Otherwise, if the counter 410 is equal to high__value (which in one embodiment is equal to 29) and no overflow has occurred as determined at decision 1250, then process 492 sets the Read__Request to zero at state 1255 and resets the counter 410 at state 1260. Once these tasks are carried out, the process 492 enters a loop 1265 to wait for the next MClk event (Edge) at decision state 1207.

9. T3/E3/DS3 Dejitter Interconnections [FIG. 15]

FIG. 5 shows the concept behind the digital dejitter circuit 390 used in one embodiment. However, for one preferred embodiment, a slight change is made when implementing the dejitter circuit for a T3/E3/DS3 system and the dejitter circuit for a T1/E1/DS1 system because the destination of the dejitter output is different in each case.

Referring to FIG. 15 in the case of a T3/E3/DS3 system, as an example, the output of the dejitter circuit 390 (Dejitter $Read_{13}$ Req) goes to a phase comparator 1520 where it is fed to a low pass filter 1530 and into a voltage controlled oscillator (VCO) 1540. The output of the VCO 1540 is sent to the dechannelizer 170 (which is in this case configured as a multiplexer). However, in the case of a T1/E1/DS1 system, the output is sent directly to a T1 line interface as shown and described in conjunction with FIG. 16. The phase comparator 1520 has two input signals, namely the Dejitter $Read_{13}$ Req from the dejitter circuit 390 and a divide-by-28 count from a divider 1560 (this divide by n count corresponds to a Read__Req. from the elastic store, where n is the number of channels, e.g., 28 channels in one embodiment). The divider 1560 obtains its input from the VCO 1540. The phase comparator 1520 outputs the instantaneous phase difference between the Dejitter $Read_{13}$ Req and the n/28 count signals. The resulting signal is then fed into the low pass filter 1530 to be averaged. The output signal from the low pass filter 1530 is then used to adjust the frequency of the VCO 1540 so that the phase difference on average of the whole system is equal to zero. The phase comparator 1520, low-pass filter 1530, the VCO 1540 and the divider circuit 1560 components together comprise the phase lock loop (PLL) circuit 1550.

10. T1/E1/DS1 Dejitter Interconnections [FIG. 16]

Referring to FIG. 16, the processing of information at the output of the dejitter circuit 390 in the case of a T1/E1/DS1 system is shown. As shown in FIG. 16, the output signals 1610, which correspond to the RD__Request, from the dejitter circuit 390 are sent back to the receive elastic store 321. The data that is read from the Rx elastic store 321 is sent to a T1/E1/DS1 line interface 1620 (not shown) via a $Read_{13}$ Data signal 1630.

To summarize the difference between the two dejitter interconnects, in the case of a T1/E1/DS1 system, the circuit 1550 is bypassed. The output can still go through the dechannelizer 170 (except that there would be no multiplexing of the data) and then to the line interface 1620.

11. Arbitration Control Block [FIG. 17]

Figure 17:
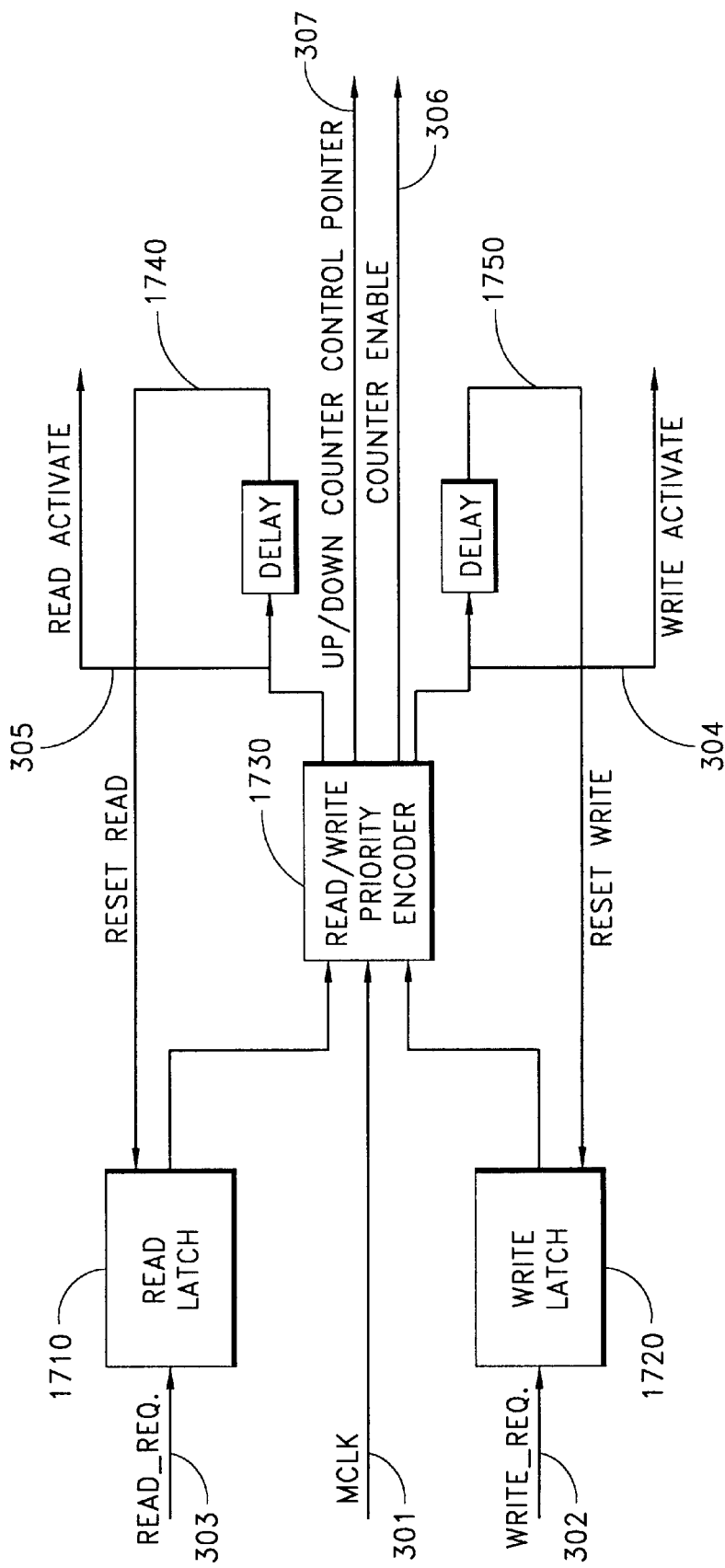
FIG. 17 is a functional block diagram of the arbitration control circuit used in the elastic store system shown in FIG. 4.

Referring now to FIG. 17, the arbitration control block 310 within the elastic store module 321 (FIG. 4) will now be described. The arbitration control block, also known as the arbiter 310 comprises a Read latch 1710, a Write latch 1720 and a Read/Write priority encoder block 1730.

In one embodiment, the arbiter has three inputs, namely a $Read_{13}$ Req signal 303 from the framer 130 (FIG. 1) in the case of the transmit elastic store 120 or from the dechannelizer 170 in case of the receive elastic store 300, a $Write_{13}$ Req signal 302 from the channelizer 110 in the case of the transmit elastic store 120 or from the deframer 140 in the case of the receive elastic store 300, and a Master Clock (MClk) 301 (FIG. 4) from the timing block 135. The Read latch 1710 converts the Read_Req pulse to a read level (which can be either zero or one) by utilizing the three Read Request X sampling registers previously mentioned above. Once the $Read_{13}$ Req pulse is converted, the resulting signal is then fed to the Read/Write priority encoder block 1730. Similarly, the Write latch 1720 converts the $Write_{13}$ Req pulse to a write level by utilizing the three Write Request X sampling registers, previously mentioned, and the resulting signal is then fed to the Read/Write priority encoder block 1730.

In one embodiment, the Read/Write priority encoder block 1730, as its name indicates, is an "AND gate" which, upon receipt of the signal from either the Write latch 1720 or Read latch 1710 and the MClik, activates the corresponding signal. For example, if a $Read_{13}$ Req is received, then block 1730 activates the Read Activate signal 305. As seen in FIG. 4, the Read Activate signal 305 is a control signal for register 350. Otherwise, if a $Write_{13}$ Req 302 is received, then block 1730 activates the Write Activate signal 304. As seen in FIG. 4, the Write Activate signal 304 is a control signal for the shift register 320.

In addition to activating one of the Read or Write Activate signals, depending on which one has more priority than the other, the Read/Write priority block 1730 controls the up/down counter 330 (FIG. 4) via the up/down control signal 307 and the $counter_{13}$ enable signal 306. Indeed, if the Read signal 305 has been activated, then the up/down counter pointer 307 is decremented. Otherwise, if the Write signal 304 is activated, then Read/Write priority encoder block 1730 increments the up/down counter pointer 307. The $counter_{13}$ enable signal 306 is activated for both read and write operations. Moreover, once either of the Read signal 305 or the Write signal 304 is activated, the corresponding levels are reset (1740 and 1750).

In view of the foregoing, it will be appreciated that the present invention overcomes the long-standing need for a simpler synchronization at the receiver, transparently transmitting data at a high data rate and monitoring the underflow and overflow states of the elastic store of wireless carrier systems without the disadvantages of conventional methods. The present invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

Appendix A $Tx_{13}$ esto.vhd

```
 1:  -------------------------------------------------------------------------
 2:  -------------------------------------------------------------------------
 3:  -- MODULE: Transmit Elastic Store
 4:  -- DESCRIPTION:
 5:  -- This shift register buffer provides a means of buffering
 6:  -- data which may be written into its input at a slightly lower
 7:  -- rate than it is read from its output. Applications include
 8:  -- framing of data with preamble and signalling bits. Functions
 9:  -- include generation of a stuff request, underflow status,
10:  -- and overflow status. All inputs and outputs are sampled by
11:  -- a high speed clock, except reset which is asynchronous.
12:  --
13:  -- Copyright 1997 Wireless Facilities Inc.
14:  -- AUTHOR: Joe Roy
15:  -------------------------------------------------------------------------
16:  -- Created                          06-04-97     J. Roy
17:  -- Added Shift Register wrap-around 09-12-97     J. Roy
18:  -- Removed wraparound               10-23-97     J. Roy
19:  -- Increased elastic store size     10-28-97     J. Roy
20:  -------------------------------------------------------------------------
21:  -------------------------------------------------------------------------
22:  library IEEE;
23:  use IEEE.std_logic_1164.all;
24:
25:  entity tx_esto is
26:      port(
27:          RES: in STD_LOGIC; -- Reset.
28:          PRE: in STD_LOGIC; -- Preset.
29:          CLK: in STD_LOGIC; -- Clock.
30:          WR_DATA: in STD_LOGIC; -- Write Data.
31:          WR_RQ: in STD_LOGIC; -- Write Request.
32:          RD_DATA: out STD_LOGIC; -- Read Data.
33:          RD_RQ: in STD_LOGIC; -- Read Request.
34:          STF: inout STD_LOGIC; -- Stuff Request.
35:          SR_PTR: inout INTEGER range 0 to 15; -- Shift Register Pointer.
36:          SR: inout STD_LOGIC_VECTOR(11 downto 0); -- Shift Register.
37:          UNDER: inout STD_LOGIC; -- Underflow Status.
38:          OVER: inout STD_LOGIC -- Overflow Status.
39:          );
40:  end tx_esto;
41:
42:  architecture behavior1 of tx_esto is
43:      signal WR_RQ1: STD_LOGIC; -- Write Request 1 sampling register.
44:      signal WR_RQ2: STD_LOGIC; -- Write Request 2 sampling register.
45:      signal WR_RQ3: STD_LOGIC; -- Write Request 3 sampling register.
```

```
-continued
46:     signal WR_RQ_FLAG: STD_LOGIC; -- Write Request Flag.
47:     signal WR_FLAG: STD_LOGIC; -- Write Flag.
48:     signal RD_RQ1: STD_LOGIC; -- Read Request 1 sampling register.
49:     signal RD_RQ2: STD_LOGIC; -- Read Request 2 sampling register.
50:     signal RD_RQ3: STD_LOGIC; -- Read Request 3 sampling register.
51:     signal RD_RQ_FLAG: STD_LOGIC; -- Read Request Flag.
52:     signal RD_FLAG: STD_LOGIC; -- Read Flag.
53:     signal INIT_FLAG: STD_LOGIC; -- Initialize Flag.
54:     constant LOLO_LIM: INTEGER range 0 to 15 := 0; --Shift
55:         -- Register Pointer Low Low Limit (Over Flow).
56:     constant LO_LIM: INTEGER range 0 to 15 := 1; -- Shift
57:         -- Register Pointer Low Limit;
58:     constant HI_LIM: INTEGER range 0 to 15 := 9; -- Shift
59:         -- Register Pointer High Limit (Stuff);
60:     constant HIHI_LIM: INTEGER range 0 to 15 := 11; -- Shift
61:         -- Register Pointer High High (Under Flow).
62: begin
63:     -- Write Request anti-metastable sampling process.
64:     process(RES,CLK,WR_RQ)
65:     begin
66:     -- Check for Reset.
67:     if RES='1' then
68:         WR_RQ1<='0'; -- Clear Write Request 1 sampling register.
69:         WR_RQ2<='0'; -- Clear Write Request 2 sampling register.
70:         WR_RQ3<='0'; -- Clear Write Request 3 sampling register.
71:     -- Check for Clock 0 to 1 transition.
72:     elsif CLK'event and CLK='1' then
73:         -- Sample Write Request 2.
74:         WR_RQ3<=WR_RQ2;
75:         -- Sample Write Request 1.
76:         WR_RQ2<=WR_RQ1;
77:         Sample Write Request.
78:         WR_RQ1<=WR_RQ;
79:     end if;
80:     end process;
81:
82:     -- Detect Write Request 0 to 1 transition process.
83:     process(RES,CLK)
84:     begin
85:     -- Check for Reset.
86:     if RES='1' then
87:         WR_RQ_FLAG<='0'; -- Clear Write Request Flag.
88:     -- Check for Clock 0 to 1 transition.
89:     elsif CLK'event and CLK='1' then
90:         -- Check for Write FLAG.
91:         if WR_FLAG='1' then
92:             WR_RQ_FLAG<='0'; -- Clear Write Request Flag.
93:         -- Detect Write Request 0 to 1 transition.
94:         elsif WR_RQ2='1' and WR_RQ3='0' then
95:             WR_RQ_FLAG<='1'; -- Set Write Request Flag.
96:         end if;
97:     end if;
98:     end process;
99:
100:    -- Read Request anti-metastable sampling process.
101:    process(RES,CLK,RD_RQ)
102:    begin
103:    -- Check for Reset.
104:    if RES='1' then
105:        RD_RQ1<='0'; -- Clear Read Request 1 sampling register.
106:        RD_RQ2<='0'; -- Clear Read Request 2 sampling register.
107:        RD_RQ3<='0'; -- Clear Read Request 3 sampling register.
108:    -- Check for Clock 0 to 1 transition.
109:    elsif CLK'event and CLK='1' then
110:        -- Sample Read Request 2.
111:        RD_RQ3<=RD_RQ2;
112:        -- Sample Read Request 1.
113:        RD_RQ2<=RD_RQ1;
114:        -- Sample Read Request.
115:        RD_RQ1<=RD_RQ;
116:    end if;
117:    end process;
118:
119:    -- Detect Read Request 0 to 1 transition process.
120:    process(RES,CLK)
121:    begin
122:    -- Check for Reset.
123:    if RES='1' then
124:        RD_RQ_FLAG<='0'; -- Clear Read Request Flag.
```

```
125:        -- Check for Clock 0 to 1 transition.
126:        elsif CLK'event and CLK='1' then
127:            -- Check for Read FLAG.
128:            if RD_FLAG='1' then
129:                RD_RQ_FLAG<='0'; -- Clear Read Request Flag.
130:            -- Detect Read Request 0 to 1 transition.
131:            elsif RD_RQ2='1' and RD_RQ3='0' then
132:                RD_RQ_FLAG<='1'; -- Set Read Request Flag.
133:            end if;
134:        end if;
135:    end process;
136:
137:    -- Read/Write semaphore process.
138:    process(RES,CLK)
139:    begin
140:        -- Check for Reset.
141:        if RES='1' then
142:            WR_FLAG<='0'; -- Clear Write Flag.
143:            RD_FLAG<='0'; -- Clear Read Flag.
144:        -- Check Clock for 0 to 1 transition.
145:        elsif CLK'event and CLK='1' then
146:            -- Check for Write Request Flag.
147:            if WR_RQ_FLAG='1' and WR_Flag='0' and RD_Flag='0' then
148:                WR_FLAG<='1'; -- Set Write Flag.
149:            else
150:                WR_FLAG<='0'; -- Clear Write Flag.
151:            end if;
152:            -- Check for Read Request Flag (Write Request has priority).
153:            if RD_RQ_FLAG='1' and RD_Flag='0' and WR_Flag='0'
154:            and WR_RQ_FLAG='0' then
155:                RD_FLAG<='1'; -- Set Read Flag.
156:            else
157:                RD_FLAG<='0'; -- Clear Read Flag.
158:            end if;
159:        end if;
160:    end process;
161:
162:    -- Buffer update process.
163:    process(RES,CLK,WR_DATA,SR,SR_PTR,STF,UNDER,OVER)
164:    variable PTR: INTEGER range 0 to 15; -- Pointer.
165:    begin
166:        -- Check for Reset.
167:        if RES='1' then
168:            INIT_FLAG<='0'; -- Clear Initialize Flag.
169:            PTR := 0; -- Clear Pointer variable.
170:            SR_PTR <= 0; -- Clear Pointer.
171:            SR(11 downto 0)<="000000000000"; -- Clear Shift Register.
172:                -- Buffer.
173:            RD_DATA<='0';
174:            STF<='0'; -- Clear Stuff request.
175:            UNDER<='0'; -- Clear Underflow status.
176:            OVER<='0'; -- Clear Overflow status.
177:        -- Check for Clock 0 to 1 transition.
178:        elsif CLK'event and CLK='1' then
179:            if INIT_FLAG='0' then
180:                PTR := HI_LIM; -- Initialize Shift Register Pointer.
181:                INIT_FLAG<='1'; -- Set Initialize Flag.
182:            end if;
183:            -- Check for Write.
184:            if WR_FLAG='1' then
185:                SR(11 downto 0) <= WR_DATA & SR(11 downto 1); -- Right
186:                    -- shift Shift Register.
187:                -- Check for Shift Register overflow.
188:                if PTR /= LOLO_LIM then
189:                    PTR := PTR-1; -- Decrement temporary Pointer.
190:                end if;
191:            -- Check for Read.
192:            elsif RD_FLAG='1' then
193:                -- Check for Shift Register Underflow.
194:                if PTR /= HIHI_LIM then
195:                    PTR := PTR+1; -- Increment temporary Pointer.
196:                end if;
197:                RD_DATA <= SR(PTR); -- Update Read Data.
198:            end if;
199:            SR_PTR<=PTR; -- Update Shift Register Pointer.
200:                -- Check for stuff.
201:            if PTR>=HI_LIM then
202:                if STF='0' then
203:                    STF<='1'; -- Set Stuff request.
```

-continued

```
204:            else
205:                STF<='0'; -- Clear Stuff request.
206:            end if;
207:        else
208:            STF<='0'; -- Clear Stuff request.
209:        end if;
210:        -- Check for Shift Register overflow.
211:        if PTR = LOLO_LIM then
212:            OVER<='1'; -- Set Overflow status.
213:        elsif PTR = HIHI_LIM then
214:            UNDER<='1'; -- Set Underflow status.
215:        else
216:            OVER<='0'; -- Clear Overflow status.
217:            UNDER<='0'; -- Clear Overflow status.
218:        end if;
219:    end if;
220:    end process;
221: end behavior1;
222:
223:
224:
```

Appendix B

Rx$_{13}$ esto.vhd

```
1:  ----------------------------------------------------------------------------------
2:  ----------------------------------------------------------------------------------
3:  -- MODULE: Receive Elastic Store
4:  -- DESCRIPTION:
5:  -- This shift register buffer provides a means of buffering
6:  -- data which may be written into its input at a slightly different
7:  -- rate than it is read from its output. Applications include
8:  -- framing of data with preamble and signalling bits. Functions
9:  -- include generation of faster and slower controls, underflow
10: -- and overflow status. Dejitter logic uses faster and slower
11: -- controls to produce a symmetrical clock for reading out the
12: -- contents of the elastic store.
13: --
14: -- All inputs and outputs are sampled by
15: -- a high speed clock, except reset which is asynchronous.
16: --
17: -- Copyright 1997 Wireless Facilities Inc.
18: -- AUTHOR: Joe Roy
19: ----------------------------------------------------------------------------------
20: -- Created                        11-18-97      J. Roy
21: ----------------------------------------------------------------------------------
22: ----------------------------------------------------------------------------------
23: library IEEE;
24: use IEEE.std_logic_1164.all;
25:
26: entity rx_esto is
27:     port(
28:         RES: in STD_LOGIC; -- Reset.
29:         CLK1: in STD_LOGIC; -- Dejitter clock.
30:         CLK2: in STD_LOGIC; -- Elastic Store Clock = Dejitter Clock/2.
31:         WR_DATA: in STD_LOGIC; -- Write Data.
32:         WR_RQ: in STD_LOGIC; -- Write Request.
33:         RD_DATA: out STD_LOGIC; -- Read Data.
34:         RD_RQ: in STD_LOGIC; -- Read Request.
35:         RD_CLK: inout STD_LOGIC; -- Read Clock.
36:         SR_PTR: inout INTEGER range 0 to 15; -- Shift Register Pointer.
37:         SR: inout STD_LOGIC_VECTOR(13 downto 0); -- Shift Register.
38:         SLOW: inout STD_LOGIC; -- Slower control.
39:         FAST: inout STD_LOGIC; -- Faster control.
40:         UNDER: inout STD_LOGIC; -- Underflow Status.
41:         OVER: inout STD_LOGIC -- Overflow Status.
42:         );
43: end rx_esto;
44:
45: architecture behavior1 of rx_esto is
46:     signal WR_RQ1: STD_LOGIC; -- Write Request 1 sampling register.
47:     signal WR_RQ2: STD_LOGIC; -- Write Request 2 sampling register.
```

-continued

```
48:        signal WR_RQ3: STD_LOGIC; -- Write Request 3 sampling register.
49:        signal WR_RQ_FLAG: STD_LOGIC; -- Write Request Flag.
50:        signal WR_FLAG: STD_LOGIC; -- Write Flag.
51:        signal RD_RQ1: STD_LOGIC; -- Read Request 1 sampling register.
52:        signal RD_RQ2: STD_LOGIC; -- Read Request 2 sampling register.
53:        signal RD_RQ3: STD_LOGIC; -- Read Request 3 sampling register.
54:        signal RD_RQ_FLAG: STD_LOGIC; -- Read Request Flag.
55:        signal RD_FLAG: STD_LOGIC; -- Read Flag.
56:        signal INIT_FLAG: STD_LOGIC; -- Initialize Flag.
57:        constant LOLO_LIM: INTEGER range 0 to 15 := 0; -- Shift
58:            -- Register Pointer Low Low Limit (Over Flow).
59:        constant LO_LIM: INTEGER range 0 to 15 := 2; -- Shift
60:            -- Register Pointer Low Limit;
61:        constant HI_LIM: INTEGER range 0 to 15 := 11; -- Shift
62:            -- Register Pointer High Limit (Stuff);
63:        constant HIHI_LIM: INTEGER range 0 to 15 := 13; -- Shift
64:            -- Register Pointer High High (Under Flow).
65:        constant HALF_CNT: INTEGER range 0 to 31 := 14; -- Dejitter
66:            -- Half Count.
67:        constant LO_CNT: INTEGER range 0 to 31 := 27; -- Dejitter
68:            -- Fast Count.
69:        constant NORM_CNT: INTEGER range 0 to 31 := 28; -- Dejitter
70:            -- Normal Count.
71:        constant HI_CNT: INTEGER range 0 to 31 := 29; -- Dejitter
72:            -- Slow Count.
73:    begin
74:        -- Write Request anti-metastable sampling process.
75:        process(RES,CLK2,WR_RQ)
76:        begin
77:        -- Check for Reset.
78:        if RES='1' then
79:            WR_RQ1<='0'; -- Clear Write Request 1 sampling register.
80:            WR_RQ2<='0'; -- Clear Write Request 2 sampling register.
81:            WR_RQ3<='0'; -- Clear Write Request 3 sampling register.
82:        -- Check for Clock 0 to 1 transition.
83:        elsif CLK2'event and CLK2='1' then
84:            -- Sample Write Request 2.
85:            WR_RQ3<=WR_RQ2;
86:            -- Sample Write Request 1.
87:            WR_RQ2<=WR_RQ1;
88:            -- Sample Write Request.
89:            WR_RQ1<=WR_RQ;
90:        end if;
91:        end process;
92:
93:        -- Detect Write Request 0 to 1 transition process.
94:        process(RES,CLK2)
95:        begin
96:        -- Check for Reset.
97:        if RES='1' then
98:            WR_RQ_FLAG<='0'; -- Clear Write Request Flag.
99:        -- Check for Clock 0 to 1 transition.
100:       elsif CLK2'event and CLK2='1' then
101:           -- Check for Write FLAG.
102:           if WR_FLAG='1' then
103:               WR_RQ_FLAG<='0'; -- Clear Write Request Flag.
104:           -- Detect Write Request 0 to 1 transition.
105:           elsif WR_RQ2='1' and WR_RQ3='0' then
106:               WR_RQ_FLAG<='1'; -- Set Write Request Flag.
107:           end if;
108:       end if;
109:       end process;
110:
111:       -- Read Request anti-metastable sampling process.
112:       process(RES,CLK2,RD_RQ)
113:       begin
114:       -- Check for Reset.
115:       if RES='1' then
116:           RD_RQ1<='0'; -- Clear Read Request 1 sampling register.
117:           RD_RQ2<='0'; -- Clear Read Request 2 sampling register.
118:           RD_RQ3<='0'; -- Clear Read Request 3 sampling register.
119:       -- Check for Clock 0 to 1 transition.
120:       elsif CLK2'event and CLK2='1' then
121:           -- Sample Read Request 2.
122:           RD_RQ3<=RD_RQ2;
123:           -- Sample Read Request 1.
124:           RD_RQ2<=RD_RQ1;
125:           -- Sample Read Request.
126:           RD_RQ1<=RD_RQ;
```

```
127:        end if;
128:        end process;
129:
130:        -- Detect Read Request 0 to 1 transition process.
131:        process(RES,CLK2)
132:        begin
133:        -- Check for Reset.
134:        if RES='1' then
135:            RD_RQ_FLAG<='0'; -- Clear Read Request Flag.
136:        -- Check for Clock 0 to 1 transition.
137:        elsif CLK2'event and CLK2='1' then
138:            -- Check for Read FLAG.
139:            if RD_FLAG='1' then
140:                RD_RQ_FLAG<='0'; -- Clear Read Request Flag.
141:            -- Detect Read Request 0 to 1 transition.
142:            elsif RD_RQ2='1' and RD_RQ3='0' then
143:                RD_RQ_FLAG<='1'; -- Set Read Request Flag.
144:            end if;
145:        end if;
146:        end process;
147:
148:        -- Read/Write semaphore process.
149:        process(RES,CLK2)
150:        begin
151:        -- Check for Reset.
152:        if RES='1' then
153:            WR_FLAG<='0'; -- Clear Write Flag.
154:            RD_FLAG<='0'; -- Clear Read Flag.
155:        -- Check Clock for 0 to 1 transition.
156:        elsif CLK2'event and CLK2='1' then
157:            -- Check for Write Request Flag (Read Request has priority).
158:            if WR_RQ_FLAG='1' and WR_Flag='0' and RD_Flag='0'
159:            and RD_RQ_FLAG='0' then
160:                    WR_FLAG<='1'; -- Set Write Flag.
161:            else
162:                WR_FLAG<='0'; -- Clear Write Flag.
163:            end if;
164:            -- Check for Read Request Flag
165:            if RD_RQ_FLAG='1' and RD_Flag='0' and WR_Flag='0' then
166:                RD_FLAG<='1'; -- Set Read Flag.
167:            else
168:                RD_FLAG<='0'; -- Clear Read Flag.
169:            end if;
170:        end if;
171:        end process;
172:
173:        -- Buffer update process.
174:        process(RES,CLK2,WR_DATA,SR,SR_PTR,UNDER,OVER,FAST,SLOW)
175:        variable PTR: INTEGER range 0 to 15; -- Pointer.
176:        begin
177:        -- Check for Reset.
178:        if RES='1' then
179:            INIT_FLAG<='0'; -- Clear Initialize Flag.
180:            PTR := 0; -- Clear Pointer variable.
181:            SR_PTR <= 0; -- Clear Pointer.
182:            SR(11 downto 0)<="000000000000"; -- Clear Shift Register.
183:                -- Buffer.
184:            RD_DATA<='0';
185:            UNDER<='0'; -- Clear Underflow status.
186:            OVER<='0'; -- Clear Overflow status.
187:            FAST<='0'; -- Clear Faster control.
188:            SLOW<='0'; -- Clear Slower control.
189:        -- Check for Clock 0 to 1 transition.
190:        elsif CLK2'event and CLK2='1' then
191:            if INIT_FLAG='0' then
192:            PTR := HI_LIM; -- Initialize Shift Register Pointer.
193:            INIT_FLAG<='1'; -- Set Initialize Flag.
194:            end if;
195:            -- Check for Write.
196:            if WR_FLAG='1' then
197:                SR(11 downto 0) <= WR_DATA & SR(11 downto 1); -- Right
198:                    -- shift Shift Register.
199:                -- Check for Shift Register overflow.
200:                if PTR /= LOLO_LIM then
201:                    PTR := PTR-1; -- Decrement temporary Pointer.
202:                end if;
203:            -- Check for Read.
204:            elsif RD_FLAG='1' then
205:                -- Check for Shift Register Underflow.
```

```
-continued
206:            if PTR /= HIHI_LIM then
207:                PTR := PTR+1; -- Increment temporary Pointer.
208:            end if;
209:            RD_DATA <= SR(PTR); -- Update Read Data.
210:        end if;
211:        SR_PTR<=PTR; -- Update Shift Register Pointer.
212:        -- Check for read rate too fast or too slow.
213:        if PTR>=HI_LIM then
214:            SLOW<='1'; -- Set Slower control.
215:        elsif PTR<=LO_LIM then
216:            FAST<='1'; -- Set Faster control.
217:        else
218:            FAST<='0'; -- Clear Faster control.
219:            SLOW<='0'; -- Clear Slower control.
220:        end if;
221:        -- Check for Shift Register overflow or underflow.
222:        if PTR = LOLO_LIM then
223:            OVER<='1'; -- Set Overflow status.
224:        elsif PTR = HIHI_LIM then
225:            UNDER<='1'; -- Set Underflow status.
226:        else
227:            OVER<='0'; -- Clear Overflow status.
228:            UNDER<='0'; -- Clear Overflow status.
229:        end if;
230:    end if;
231:    end process;
232:
233:    -- Dejitter process.
234:    process(RES,CLK1,FAST,SLOW)
235:    variable CTR: INTEGER range 0 to 31; -- Counter.
236:    begin
237:    -- Check for Reset.
238:    if RES='1' then
239:        RD_CLK<='0'; -- Clear Read Request.
240:        CTR := 0; -- Clear Counter.
241:    -- Check for Clock 0 to 1 transition.
242:    elsif CLK1'event and CLK1='1' then
243:    -- Check for half count (symmetrical waveform).
244:        if CTR=HALF_CNT then
245:            RD_CLK<='0';
246:        end if;
247:
248:        if CTR=LO_CNT and FAST='1' then
249:            RD_CLK<='1';
250:            CTR := 0; -- Clear Counter.
251:        elsif CTR=NORM_CNT and FAST='0' and SLOW='0' then
252:            RD_CLK<='1';
253:            CTR := 0; -- Clear Counter.
254:        elsif CTR>=HI_CNT then
255:            RD_CLK<='1';
256:            CTR := 0; -- Clear Counter.
257:        else
258:            CTR := CTR+1; -- Increment Counter.
259:        end if;
260:    end if;
261:    end process;
262: end behavior1;
263:
264:
265:
```

What is claimed is:

1. A synchronous elastic store system, comprising:
a shift register having a plurality of data bits, the shift register receiving a stream of digital input data and a single master clock input signal, wherein the digital input data is independent from the single master clock input signal;
an arbiter that arbitrates between a read request and a write request to the shift register, the arbiter having the single master clock as an input signal and providing a control signal to the shift register; and
a digital dejitter circuit receiving at least one status signal from the elastic store and providing a read request signal to the elastic store.

2. The system defined in claim 1, wherein the master clock is an input signal to the dejitter circuit.

3. The system defined in claim 1, wherein the at least one status signal comprises a near underflow signal and a near overflow signal.

4. The system defined in claim 1, wherein the at least one status signal comprises high and low limit signals for the shift register.

5. A synchronous digital elastic store system, comprising:
a shift register receiving a stream of digital input data and a master clock input signal, said master clock signal being independent of the digital input data;
an arbiter that arbitrates between a read request and a write request, the arbiter providing a control signal to the shift register and generating at least one counter control signal;

an up/down counter receiving the counter control signal from the arbiter and generating selector control signals; and a selector circuit receiving data from the shift register and receiving selector control signals from the up/down counter, said selector circuit selecting one of the shift register bits to be read from the elastic store.

6. The system defined in claim 5, additionally comprising a register that latches the selected output of the selector circuit.

7. The system defined in claim 5, additionally comprising a plurality of comparators that generate status signals in response to the output of the up/down counter and predetermined status levels.

8. The system defined in claim 7, additionally comprising a digital dejitter circuit receiving a status signal from at least one of the comparators and providing a read request signal to the elastic store.

9. A synchronous elastic store system, comprising:

a channelizer;

a synchronous elastic store having a read/write arbiter, the synchronous elastic store receivably connected to the channelizer;

a framer being receivably connected to the synchronous elastic store; and a wireless transmitter circuit receivably connected to the framer.

10. A synchronous elastic store system, comprising:

a wireless receiver circuit;

a deframer being receivably connected to the wireless receiver circuit;

a synchronous elastic store having a read/write arbiter, the synchronous elastic store receivably connected to the deframer; and a dechannelizer receivably connected to the synchronous elastic store.

11. A synchronous elastic store system, comprising:

a shift register having a plurality of data bits, the shift register receiving a stream of digital input data and a single master clock input signal, wherein the digital input data is independent from the single master clock input signal; and an arbiter that arbitrates between a read request and a write request to the shift register, the arbiter having the single master clock as an input signal and providing a control signal to the shift register, wherein the elastic store is utilized in a communication system and includes a transmit elastic store and a receive elastic store, wherein the length of the shift register of the transmit elastic store is different than the length of the shift register of the receive elastic store.

* * * * *